US009071798B2

United States Patent
Hoffert et al.

(10) Patent No.: US 9,071,798 B2
(45) Date of Patent: Jun. 30, 2015

(54) SYSTEM AND METHOD FOR SWITCHING BETWEEN MEDIA STREAMS FOR NON-ADJACENT CHANNELS WHILE PROVIDING A SEAMLESS USER EXPERIENCE

(71) Applicant: Spotify AB, Stockholm (SE)

(72) Inventors: Eric Hoffert, South Orange, NJ (US);
Mike Berkley, Cold Springs, NY (US);
Kevin Faaborg, Brooklyn, NY (US);
Gustav Soderstrom, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 14/165,508

(22) Filed: Jan. 27, 2014

(65) Prior Publication Data

US 2014/0373057 A1  Dec. 18, 2014

Related U.S. Application Data

(60) Provisional application No. 61/836,079, filed on Jun. 17, 2013.

(51) Int. Cl.
*H04N 7/173* (2011.01)
*H04N 5/445* (2011.01)
(Continued)

(52) U.S. Cl.
CPC ......... *H04N 5/44591* (2013.01); *H04N 5/4403* (2013.01); *G06F 3/017* (2013.01);
(Continued)

(58) Field of Classification Search
USPC ............................................. 725/44, 47, 131
See application file for complete search history.

(56) References Cited

U.S. PATENT DOCUMENTS 5,682,207 A  10/1997 Takeda et al.
6,208,354 B1  3/2001 Porter
(Continued)

FOREIGN PATENT DOCUMENTS

EP  1672923 A1  6/2006
EP  1775953 A1  4/2007
(Continued)

OTHER PUBLICATIONS

Hoffert, Office Action U.S. Appl. No. 14/165,514, May 9, 2014, 19 pgs.
(Continued)

*Primary Examiner* — Pankaj Kumar
*Assistant Examiner* — Charles N Hicks
(74) *Attorney, Agent, or Firm* — Morgan, Lewis & Bockius LLP

(57) ABSTRACT

An electronic device with one or more processors, memory and a display receives a first request to display a first video stream that corresponds to a first channel in a predetermined sequence of channels. In response to the first request, the device displays the first video stream. While displaying the first video stream, the device receives a second request to display a second video stream that corresponds to a second channel in the predetermined sequence of channels and is separated from the first channel by one or more intervening channels. In response to receiving the second request, the device displays at least a portion of the first video stream concurrently with recently received content of one or more of the intervening channels and displays recently received content of one or more of the intervening channels concurrently with at least a portion of the second video stream.

24 Claims, 25 Drawing Sheets

(51) Int. Cl.

| | |
|---|---|
| H04N 5/44 | (2011.01) |
| G06F 3/01 | (2006.01) |
| H04L 29/06 | (2006.01) |
| H04N 21/437 | (2011.01) |
| H04N 21/438 | (2011.01) |
| H04N 21/482 | (2011.01) |
| H04N 21/422 | (2011.01) |
| H04N 21/431 | (2011.01) |
| H04N 21/433 | (2011.01) |
| H04N 21/44 | (2011.01) |
| H04N 21/442 | (2011.01) |
| H04N 21/43 | (2011.01) |
| H04N 21/439 | (2011.01) |
| H04N 21/466 | (2011.01) |
| H04N 21/475 | (2011.01) |
| H04N 21/41 | (2011.01) |

(52) U.S. Cl.
CPC ............. *H04L 65/60* (2013.01); *H04N 21/437* (2013.01); *H04N 21/4384* (2013.01); *H04N 21/482* (2013.01); *H04N 21/42222* (2013.01); *H04N 21/42224* (2013.01); *H04N 21/4307* (2013.01); *H04N 21/4312* (2013.01); *H04N 21/4331* (2013.01); *H04N 21/4383* (2013.01); *H04N 21/4392* (2013.01); *H04N 21/44004* (2013.01); *H04N 21/44209* (2013.01); *H04N 21/4667* (2013.01); *H04N 21/4755* (2013.01); *H04N 21/4126* (2013.01); *H04N 21/4314* (2013.01)

(56) References Cited

U.S. PATENT DOCUMENTS

| | | | |
|---|---|---|---|
| 6,384,869 B1 | 5/2002 | Sciammarella et al. | |
| 6,804,824 B1 | 10/2004 | Potrebic et al. | |
| 6,919,929 B1 | 7/2005 | Iacobelli et al. | |
| 7,519,223 B2 | 4/2009 | Dehlin et al. | |
| 7,797,713 B2 | 9/2010 | Dawson et al. | |
| 8,146,019 B2 | 3/2012 | Kim et al. | |
| 8,341,662 B1 | 12/2012 | Bassett et al. | |
| 8,341,681 B2* | 12/2012 | Walter et al. ................... 725/97 |
| 8,532,464 B2 | 9/2013 | Randall | |
| 8,564,728 B2 | 10/2013 | Petersson et al. | |
| 8,683,377 B2 | 3/2014 | Zuverink et al. | |
| 8,736,557 B2 | 5/2014 | Chaudhri | |
| 2004/0003399 A1 | 1/2004 | Cooper | |
| 2004/0221306 A1* | 11/2004 | Noh ................................. 725/44 |
| 2005/0114885 A1 | 5/2005 | Shikata et al. | |
| 2005/0138658 A1 | 6/2005 | Bryan | |
| 2005/0234992 A1 | 10/2005 | Haberman | |
| 2006/0015904 A1 | 1/2006 | Marcus | |
| 2006/0075428 A1 | 4/2006 | Farmer et al. | |
| 2006/0159184 A1 | 7/2006 | Jang | |
| 2007/0028270 A1 | 2/2007 | Ostojic et al. | |
| 2007/0067815 A1 | 3/2007 | Bowen et al. | |
| 2007/0083911 A1 | 4/2007 | Madden et al. | |
| 2007/0169156 A1 | 7/2007 | Zeng | |
| 2007/0263066 A1 | 11/2007 | Henning et al. | |
| 2008/0126919 A1 | 5/2008 | Uskali et al. | |
| 2008/0155459 A1 | 6/2008 | Ubillos | |
| 2009/0046545 A1 | 2/2009 | Blinnikka | |
| 2009/0100380 A1 | 4/2009 | Gardner et al. | |
| 2009/0119594 A1 | 5/2009 | Hannuksela | |
| 2009/0195515 A1 | 8/2009 | Lee | |
| 2010/0077441 A1 | 3/2010 | Thomas et al. | |
| 2010/0153999 A1 | 6/2010 | Yates | |
| 2010/0162180 A1 | 6/2010 | Dunnam et al. | |
| 2010/0175026 A1 | 7/2010 | Bortner et al. | |
| 2010/0180297 A1 | 7/2010 | Levine et al. | |
| 2010/0235733 A1 | 9/2010 | Drislane et al. | |
| 2010/0235746 A1 | 9/2010 | Anzures | |
| 2010/0287586 A1 | 11/2010 | Walter et al. | |
| 2011/0066703 A1 | 3/2011 | Kaplan et al. | |
| 2011/0090402 A1 | 4/2011 | Huntington et al. | |
| 2011/0119611 A1 | 5/2011 | Ahn et al. | |
| 2011/0119711 A1 | 5/2011 | Marshall et al. | |
| 2011/0242002 A1 | 10/2011 | Kaplan et al. | |
| 2011/0289139 A1 | 11/2011 | Mcintosh et al. | |
| 2011/0289534 A1 | 11/2011 | Jordan et al. | |
| 2011/0296351 A1 | 12/2011 | Ewing, Jr. et al. | |
| 2012/0030619 A1 | 2/2012 | Lee et al. | |
| 2012/0054679 A1 | 3/2012 | Ma et al. | |
| 2012/0079429 A1 | 3/2012 | Stathacopoulos et al. | |
| 2012/0131459 A1 | 5/2012 | Ilama-Vaquero et al. | |
| 2012/0137216 A1 | 5/2012 | Choi | |
| 2012/0141095 A1 | 6/2012 | Schwesinger et al. | |
| 2012/0158802 A1 | 6/2012 | Lakshmanan et al. | |
| 2012/0170903 A1 | 7/2012 | Shirron et al. | |
| 2012/0180090 A1 | 7/2012 | Yoon et al. | |
| 2012/0182384 A1 | 7/2012 | Anderson et al. | |
| 2012/0204106 A1 | 8/2012 | Hill et al. | |
| 2012/0213295 A1 | 8/2012 | Quere et al. | |
| 2012/0216117 A1 | 8/2012 | Arriola et al. | |
| 2012/0221950 A1 | 8/2012 | Chao et al. | |
| 2012/0254793 A1 | 10/2012 | Briand et al. | |
| 2012/0254926 A1 | 10/2012 | Takahashi et al. | |
| 2012/0257120 A1 | 10/2012 | Nakai | |
| 2012/0290933 A1 | 11/2012 | Rajaraman et al. | |
| 2012/0311444 A1 | 12/2012 | Chaudhri | |
| 2012/0323917 A1 | 12/2012 | Mercer et al. | |
| 2013/0016129 A1 | 1/2013 | Gossweiler, III et al. | |
| 2013/0080895 A1 | 3/2013 | Rossman et al. | |
| 2013/0145268 A1 | 6/2013 | Kukulski | |
| 2013/0179925 A1* | 7/2013 | Woods et al. ................... 725/42 |
| 2013/0222274 A1 | 8/2013 | Mori et al. | |
| 2013/0236158 A1 | 9/2013 | Lynch et al. | |
| 2013/0263047 A1 | 10/2013 | Allen et al. | |
| 2013/0265501 A1 | 10/2013 | Murugesan et al. | |
| 2013/0275924 A1 | 10/2013 | Weinberg et al. | |
| 2013/0283154 A1 | 10/2013 | Sasakura | |
| 2013/0293454 A1 | 11/2013 | Jeon et al. | |
| 2013/0307792 A1 | 11/2013 | Andres et al. | |
| 2013/0309986 A1* | 11/2013 | Cox et al. ................... 455/179.1 |
| 2013/0332835 A1 | 12/2013 | Mace | |
| 2014/0059479 A1 | 2/2014 | Hamburg et al. | |
| 2014/0082497 A1 | 3/2014 | Chalouhi et al. | |
| 2014/0098140 A1 | 4/2014 | Tran et al. | |
| 2014/0108929 A1 | 4/2014 | Garmark et al. | |
| 2014/0114985 A1 | 4/2014 | Mok et al. | |
| 2014/0143725 A1 | 5/2014 | Lee | |
| 2014/0157124 A1 | 6/2014 | Roberts et al. | |
| 2014/0164984 A1 | 6/2014 | Farouki | |
| 2014/0176479 A1 | 6/2014 | Wardenaar | |
| 2014/0178047 A1 | 6/2014 | Apodaca et al. | |
| 2014/0282281 A1 | 9/2014 | Ram et al. | |

FOREIGN PATENT DOCUMENTS

| | | |
|---|---|---|
| EP | 2469841 A1 | 6/2012 |
| WO | WO 2009/088952 A1 | 7/2009 |
| WO | WO2011/095693 A1 | 8/2011 |
| WO | WO2013/022486 A1 | 2/2013 |

OTHER PUBLICATIONS

Hoffert, Office Action U.S. Appl. No. 14/165,512, May 28, 2014, 19 pgs.

Hoffert, Office Action U.S. Appl. No. 14/165,517, May 28, 2014, 18 pgs.

Hoffert, Office Action U.S. Appl. No. 14/165,507, May 14, 2014, 18 pgs.

Hoffert, Office Action U.S. Appl. No. 14/165,513, Jun. 6, 2014, 13 pgs.

Hoffert, Office Action U.S. Appl. No. 14/222,299, Jul. 3, 2014, 35 pgs.

Spotify AB, Invitation to Pay Additional Fees and Partial International Search Report, PCTUS2014/042571, Sep. 24, 2014, 6 pgs.

Hoffert, Final Office Action U.S. Appl. No. 14/165,514, Oct. 23, 2014, 23 pgs.

(56) References Cited

OTHER PUBLICATIONS

Hoffert, Final Office Action U.S. Appl. No. 14/165,513, Nov. 7, 2014, 14 pgs.
Hoffert, Notice of Allowance U.S. Appl. No. 14/165,512, Oct. 14, 2014, 5 pgs.
Hoffert, Final Office Action U.S. Appl. No. 14/165,517, Oct. 7, 2014, 7 pgs.
Hoffert, Final Office Action U.S. Appl. No. 14/165,507, Oct. 22, 2014, 20 pgs.
Hoffert, Final Office Action U.S. Appl. No. 14/222,299, Nov. 28, 2014, 45 pgs.
Spotify AB, International Search Report, PCTUS2014/042571, Dec. 12, 2014, 6 pgs.
Hoffert, Notice of Allowance, U.S. Appl. No. 14/165,517, Jan. 21, 2015, 6 pgs.
Hoffert, Office Action U.S. Appl. No. 14/165,514, Mar. 3, 2015, 19 pages.
Hoffert, Office Action U.S. Appl. No. 14/165,513, Mar. 27, 2015, 16 pages.
Hoffert, Notice of Allowance U.S. Appl. No. 14/165,512, Mar. 2, 2015, 6 pages.
Hoffert, Notice of Allowance, U.S. Appl. No. 14/165,507, Mar. 16, 2015, 17 pages.
Hoffert, Notice of Allowance U.S. Appl. No. 14/222,299, Apr. 13, 2015, 8 pages.
ISO/IEC 14496-12, Oct. 1, 2005, International Standard, ISO/IEC, XP55178146, 94 pages.
Siglin, "Unifying Global Video Strategies, MP4 File Fragmentation for Broadcast, Mobile and Web Delivery," A Transitions in Technology White Paper, Nov. 16, 2011, 16 pages.
Spotify AB, International Search Report and Written Opinion, PCT/IB2014/002831, Mar. 19, 2015, 11 pages.
Spotify AB, Invitation to Pay Additional Fees and Partial Search Report, PCT/IB/2014002726, Mar. 31, 2015, 8 pages.
Zambelli, Alex, "IIS Smooth Streaming Technical Overview," Mar. 1, 2009, Microsoft Corporation, downloaded from http://dfpcorec-p.international.epo.org/wf/storage/14C3247F2EA000308DF/originalPdf, 8 pages.

* cited by examiner

SYSTEM AND METHOD FOR SWITCHING BETWEEN MEDIA STREAMS FOR NON-ADJACENT CHANNELS WHILE PROVIDING A SEAMLESS USER EXPERIENCE

RELATED APPLICATIONS

This application claims priority to U.S. Provisional Patent Application Ser. No. 61/836,079, filed Jun. 17, 2013, entitled "System and Method for Switching Between Media Streams while Providing a Seamless User Experience," which application is incorporated by reference in its entirety.

This application is related to U.S. Provisional Patent Application Ser. No. 61/861,330, filed Aug. 1, 2013, entitled "Transitioning from Decompressing One Compressed Media Stream to Decompressing another Media Stream;" U.S. Provisional Patent Application Ser. No. 61/881,353, filed Sep. 23, 2013, entitled "System and Method for Efficiently Providing Media and Associated Metadata;" and U.S. Provisional Patent Application Ser. No. 61/892,343, filed Oct. 17, 2013, entitled "System and Method for Switching between Media Items in a Plurality of Sequences of Media Items," which applications are incorporated by reference in their entireties.

TECHNICAL FIELD

The disclosed implementations relate to presenting media content generally and switching between media streams in particular.

BACKGROUND

As computer technology has improved and become ubiquitous, users increasingly are able to use computer based devices to consume media content. For example, users can listen to audio content or watch video content on a variety of computer based electronic devices. In addition, advances in network technology have increased the speed and reliability with which information can be transmitted over computer networks. As such, it is possible to stream media data over computer networks as needed rather than transmitting a file in a physical media, such as a CD or DVD, or downloading the entire file before consuming the media content.

SUMMARY

Despite the advances in networking speed and reliability, some solutions for streaming media are sometimes cumbersome and involve excessive loading times. This is especially true when transitioning between media streams on a wireless or other low bandwidth network that does not have sufficient bandwidth to simultaneously receive high bandwidth versions of a large number of media streams. In such circumstances, if a user attempts to scan through several video streams (e.g., channel surfing through television channels), the user will likely experience frequent breaks to load content that degrade the user's experience.

Accordingly, there is a need for a method to reduce the time needed to switch between media stream channels to provide a seamless user experience where media streams are loaded quickly even where network bandwidth is constrained (e.g., by preloading content from one or more adjacent media channels). Such methods and interfaces may complement or replace conventional methods for switching between media stream channels. Such methods and interfaces enhance the user experience as the user is able to quickly switch between media stream channels. In particular, users watching live media streams (e.g., live sporting events) will be able to browse through different channels without undue delay (e.g., without being shown a "now loading" or "waiting to buffer" message and/or an icon indicating that the content is buffering such as an hourglass, spinning icon or progress bar).

In accordance with some implementations, a method for switching between video streams is disclosed. The method is performed at an electronic device with one or more processors, memory, and a display. The electronic device receives a first request to display a first video stream on the display. In response to receiving the first request, the electronic device displays the first video stream on the display. While displaying the first video stream on the display, the electronic device receives a second request to display a second video stream on the display. In response to receiving the second request, the electronic device displays at least a portion of the first video stream on the display concurrently with at least a portion of the second video stream, where the second video stream was received, at least in part, from a content source in response to a request from the electronic device to the content source for delivery of the second video stream from the content source.

In accordance with some implementations, a method for switching between video streams is disclosed. The method is performed at an electronic device with one or more processors, memory, and a display: The electronic device receives a first request to display a first video stream on the display, wherein the first video stream corresponds to a first channel in a predetermined sequence of channels. In response to receiving the first request, the electronic device displays the first video stream on the display. While displaying the first video stream on the display, the electronic device receives a second request to display a second video stream on the display, where the second video stream corresponds to a second channel in the predetermined sequence of channels and the second channel is separated from the first channel in the predetermined sequence by one or more intervening channels. In response to receiving the second request, the electronic device displays at least a portion of the first video stream on the display concurrently with at least a portion of the recently received content of one or more of the intervening channels. The electronic device displays at least a portion of the recently received content of one or more of the intervening channels concurrently with at least a portion of the second video stream.

In accordance with some implementations, a computer system (e.g., a client system or server system) includes one or more processors, memory, and one or more programs; the one or more programs are stored in the memory and configured to be executed by the one or more processors and the one or more programs include instructions for performing the operations of the method described above. In accordance with some implementations, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
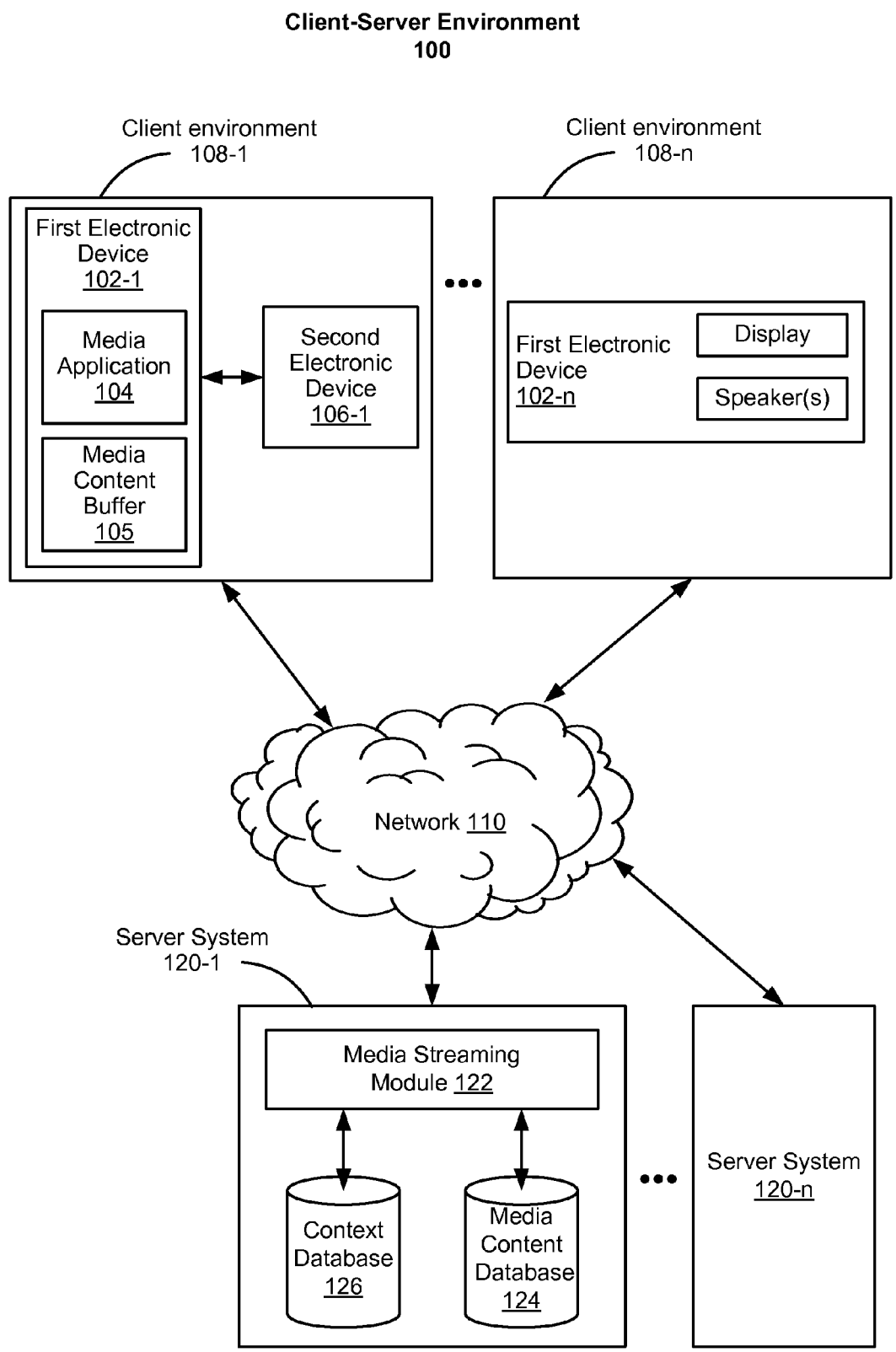
FIG. 1 is a block diagram illustrating a server client environment in accordance with some implementations.

Attention is now directed to the figures, and in particular to FIG. 1, which is a block diagram of a client-server environment, according to some implementations. The client-server environment 100 includes one or more client environments (108-1 ... 108-n) and one or more server systems (120-1 ... 120-n) that are connected through a network 110. In some implementations, the client environment 108-1 includes one or more electronic devices (e.g., first electronic device 102-1 and second electronic device 106-1). In some implementations, the server system 120-1 is associated with a media content provider with which users (and their electronic devices) optionally have accounts that enable the users to access media content from one of the server systems (120-1 ... 120-n). The network 110 such as the Internet, other Wide Area Networks, Local Area Networks, Personal Area Networks, metropolitan area networks, VPNs, local peer-to-peer and/or ad-hoc connections, and so on.

In some implementations, the client environment 108-1 includes a first electronic device 102-1 (e.g., a controlling electronic device). In some implementations, the first electronic device 102-1 is one of the group of: a personal computer, a mobile electronic device, a laptop, a tablet computer, a mobile phone, a digital media player, or any other electronic device able to present media content.

In some implementations, the client environment 108-1 also includes a second electronic device 106-1 (e.g., a controlled electronic device). In some implementations, the second electronic device 106-1 is one of the group of: a computer, an audio/visual system, a media receiver/player, television or similar display device or any other electronic device able to present media content. In some implementations, both the first electronic device 102-1 and the second electronic device 106-1 are associated with a common user account (or associated user accounts) provided by a content provider with which the server system 120 is associated. For example, in some implementations, the server system 120 is operated and/or provided by a subscription-based media streaming service to which a user, optionally, has an account, and the first and second electronic devices 102-1, 106-1 are each associated with account credentials that enable them to communicate with and receive content from the server system 120-1. In some implementations, the first electronic device 102-1 (e.g., a personal computer or a set top box) is associated with account credentials and receives content from server system 120-1, and the second electronic device 106-1 is a media presentation device (e.g., a set of speakers, a television, etc.) that receives the content from the first electronic device 102-1 and presents that content to the user.

In some implementations, both the first electronic device 102-1 and the second electronic device 106-1 are on the same local network. In some implementations, the first electronic device 102-1 and the second electronic device 106-1 are on different local networks. In some implementations, the local network is a Local Area Network. In some implementations, the server system 120 is not located on the same Local Area Network as either the first electronic device 102-1 or the second electronic device 106-1.

As noted above, Local Area Networks are often associated with a relatively small geographic area (e.g., one house or building) and create IP address space behind a traffic routing device. In some implementations, the traffic routing device uses network address translation to connect devices within the LAN to devices outside the LAN. Network address translation is the process of readdressing packets by modifying the IP address contained in each packet so that the packets reach their intended destination device. Network address translation allows a plurality of electronic devices on the Local Area Network to connect to the Internet through a single IP address (e.g., the IP address of the traffic routing device). The traffic routing device (i.e. a router) receives incoming packets, determines which device on the Local Area Network is the intended recipient, and modifies the IP address to correctly identify that device. For example, a Local Area Network has 5 devices with local IP addresses 192.168.0.1-192.168.0.5 that all connect to a router. The router connects to the Internet and has an IP address of 12.162.29.2. Using network address translation, the router translates the source address for all communications sent from any of the 5 devices and intended for destinations in the Internet to be 12.162.29.2 (the router's IP address). On the other hand, the router collects all packets incoming from the Internet, determines the intended recipient device based upon the contents of each packet, and translates the destination IP address to the address of the correct device on the Local Area Network. So when the intended device is the device with Local Area Network IP address 196.168.0.2, the router would change the destination address to this address. Local Area Networks also commonly use firewalls to limit incoming connections. In this way, computer devices outside of the Local Area Network are generally not able to communicate directly with the devices on a Local Area Network. Indeed, in some Local Area Networks the devices in the network are not contactable even by other devices in the Local Area Network.

In some implementations, both the first electronic device 102-1 and the second electronic device 106-1 are on the same Personal Area Network. In some implementations, the Personal Area Network uses BLUETOOTH communication technology. In some implementations, the server system 120 is not located on the same Personal Area Network as either the first electronic device 102-1 or the second electronic device 106-1.

In some implementations, the first electronic device 102-1 includes a media content presentation and control application 104 (hereinafter "media application"). The media application 104 is able to control the presentation of media by the electronic device 102-1. For example, the media application 104 enables a user to navigate media content items, select media content items for playback on the electronic device 102-1, select media streams for presentation, change currently displayed media streams, create and edit playlists, etc. In some implementations, media content is stored by the first electronic device 102-1 itself. In other implementations, the media content is stored by a server system 120, which is, optionally, located remotely from the first electronic device 102-1. The media content is then streamed from the server system 120 to the first electronic device 102-1 over the network 110.

In some implementations, the data streamed from the server system 120 is stored/cached by the first electronic device 102-1 in the media content buffer 105 in the memory of the first electronic device 102-1. In some implementations, media content stored in the media content buffer 105 is removed after the media content is presented by the first electronic device 102-1, allowing new media content data to be stored in the buffer 105. In other implementations, at least some of the media content stored in the media content buffer 105 is retained for a predetermined amount of time after the content is presented by the first electronic device 102-1 and/or until other predetermined conditions are satisfied. In some implementations, the media content buffer 105 stores media content from a first media stream. The media content of the first stream is received from a server system 120-1. In some implementations, the media content buffer stores media content from more than one media content stream.

In some implementations, the media application 104 is also able to control media content presentation by the second electronic device 106-1 (e.g., a set of speakers or a television set or other display), which is distinct from the first electronic device 102-1. Thus, the user is able to use the media application 104 to cause the first electronic device 102-1 to act both as a media presentation device as well as a remote control for other media presentation devices. This allows a user to control media presentation on multiple electronic devices from within a single application 104, and/or using a single user interface.

In some implementations, when a user wants to use the first electronic device 102-1 to control media presentation by the second electronic device 106-1, the user interacts with the media application 104 to send a media control request (e.g., server media control request 112, FIG. 2B) to the server system 120. The server system 120 receives the media control request over the network 110. For example, the user is enabled to press a button on a touchscreen of the first electronic device 102-1 in order to send the media control request to the server system 120 and/or directly to the second electronic device 106-1. As described below, a media control request is, for example, a request to begin presentation of media content by the second electronic device 106-1. Though often used herein to describe requests to initiate or begin presentation of media by the second electronic device 106-1, in some implementations, media control requests also include requests and/or signals to control other aspects of the media that is being presented on the second electronic device 106-1, including but not limited to commands to pause, skip, fast-forward, rewind, adjust volume, change the order of items in a playlist, add or remove items from a playlist, adjust audio equalizer settings, change or set user settings or preferences, provide information about the currently presented content, begin presentation of a media stream, and transition from a current media stream to another media stream, and the like.

The client-server environment 100 also includes a server system 120. In some implementations, the server system 120 includes a media streaming module 122, a media content database 124, and a context database 126. The media content database 124 stores media content that can be presented by an electronic device. For example, in some implementations, the media content database 124 stores audio (e.g., music, audio books, etc.), video (e.g., movies, television shows, etc.), images, or other content that can be streamed to other electronic devices. In some implementations, the media content database includes data stored in different formats and file types to allow a variety of different devices and/or applications to receive streamed content. In some implementations, the data is stored in a single file format and is converted/transcribed/transcoded to the appropriate data type or format before or as it is streamed to a remote device.

In some implementations, the server system 120 includes a media streaming module 122. In some implementations, the media streaming module 122 receives media control requests from electronic devices and streams media content in response. In some implementations, the media streaming module 122 receives media control requests from a first electronic device 102-1 and forwards the request to a second electronic device 106-1, which then makes a subsequent request to the server system 120 for the media content. For example, a user sends a media control request to the server using a mobile phone (a first electronic device) requesting that media be presented by a home stereo system (a second electronic device). The server system 120 then sends the requested media (and/or the media control request) to the home stereo system. This and other techniques are discussed in greater detail below with respect to FIGS. 5-7.

In some implementations, the received media control request includes information identifying the electronic device to which the server system 120 should forward the media control request. For example, a user optionally has multiple electronic devices that can present media from the server system 120, such as a mobile phone, a computer system, a television, a home stereo, etc. In some implementations, the identifying information is a unique or semi-unique device identifier, such as an IP address, a Media Access Control address (MAC address), a user-specified device name, an International Mobile Equipment Identity number (IMEI number), or the like. Accordingly, the media control request will identify that a request is intended for the home stereo, for example, so that the server system 120 can send the requested media and/or the media control request to the home stereo. In some embodiments, the electronic device provides the server system with an indication of device capabilities of the device such as screen resolution, processing speed, video buffer size/availability, codec availability and the like, and the server system provides content to the electronic device in accordance with the device capabilities.

In some implementations, the server system 120 includes a context database 126. The context database 126 stores data associated with the presentation of media content by an electronic device. In some implementations, the context database 126 includes, among other things, the current position in a media content stream that is being presented by an electronic device, a playlist associated with the media content stream, previously played content, skipped pieces of media content, and previously indicated user preferences. For example, the context database, optionally, includes information that a content stream to an electronic device currently is presenting a song, at 1 minute and 23 seconds into the song, as well as all the songs played in the last hour and the next 20 songs in the playlist. In some implementations, the server system 120 transmits the context associated with a media content stream to the device that is presenting the content stream so that one or more items of context information can be used by the device, such as for display to the user. In some implementations, when the device to which the media content is being streamed changes, the server system 120 transmits the context associated with the active media content to the newly active device.

Figure 2:
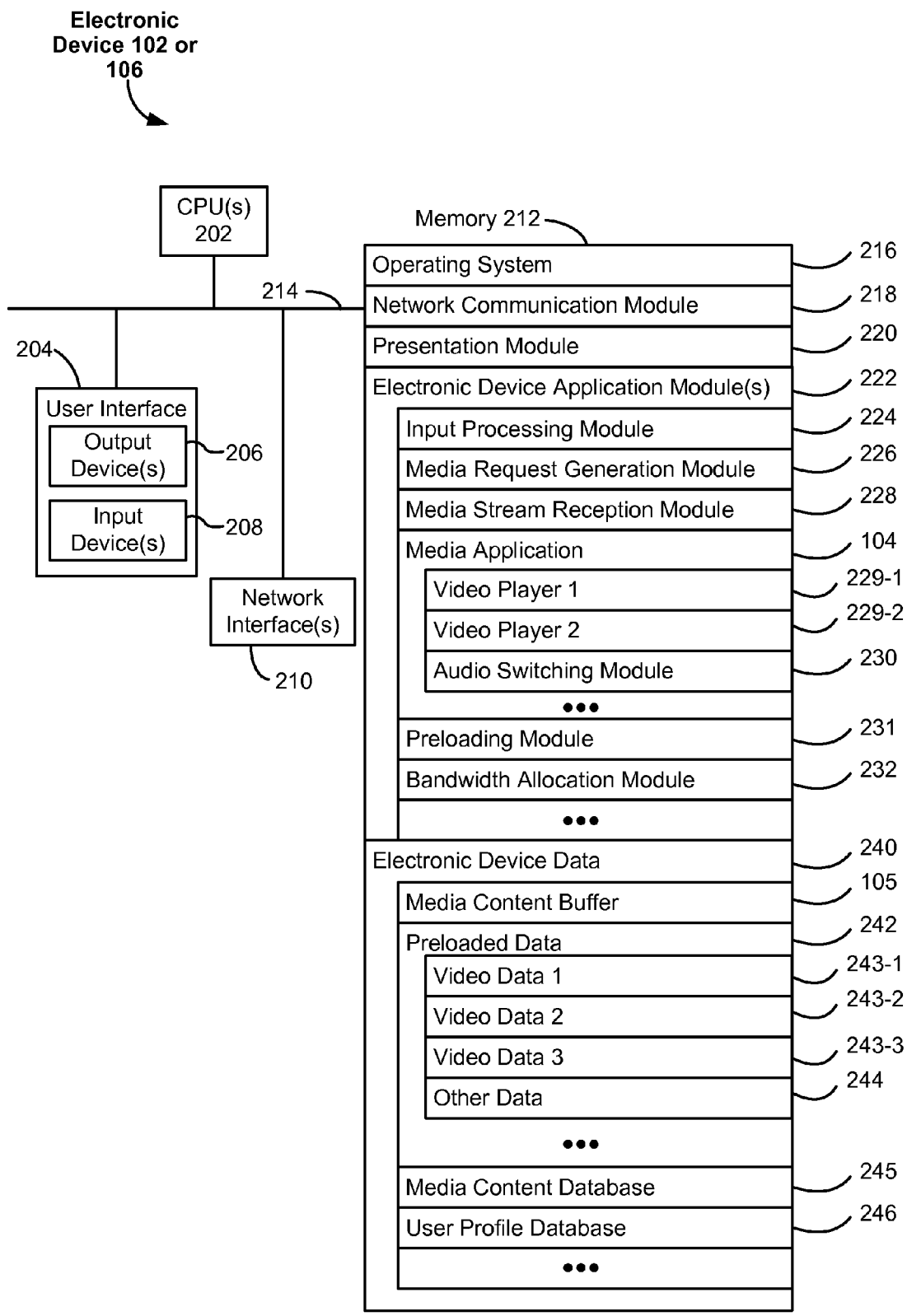
FIG. 2 is a block diagram illustrating an electronic device in accordance with some implementations.

FIG. 2 is a block diagram illustrating an electronic device 102 (or electronic device 106), in accordance with some implementations. The electronic device 102 typically includes one or more processing units (CPUs) 202, one or more network interfaces 210, memory 212, and one or more communication buses 214 for interconnecting these components. The electronic device 102 includes a user interface 204. The user interface 204 includes output device(s) 206, including user interface elements that enable output 206 to be presented to a user, including via speakers or a visual display (sometimes referred to herein as a second electronic device 106). The user interface 204 includes input device(s) 208, including user interface components that facilitate user input such as a keyboard, a mouse, a voice-command input unit, a touch sensitive display, a touch-sensitive input pad, a gesture capturing camera, or other input buttons. In some implementations, the electronic device 102 is a wireless device, such as a mobile phone or a tablet computer. Furthermore, some electronic devices 102 use a microphone and voice recognition or a camera and gesture recognition to supplement or replace the keyboard. Memory 212 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 212 optionally includes one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the electronic device 102 to other computers via the one or more communication network interfaces 210 (wired or wireless) and one or more communication networks, such as the Internet, other Wide Area Networks, Local Area Networks, Personal Area Networks, metropolitan area networks, VPNs, local peer-to-peer and/or ad-hoc connections, and so on;
- a presentation module 220 for enabling presentation of media content at the electronic device 102 through the output devices 206 associated with the user interface 204 (e.g., screens, speakers, headphones, etc.);
- one or more client system applications module(s) 222 for enabling the electronic device 102 to perform the functions offered by the client system 102, the application module(s) 222 including but not limited to:
  - an input processing module 224 for receiving input from a user through an input device 208 and interpreting the received input;
  - a media request generation module 226 for generating a request for media stream data based on input received from the input processing module 224;
  - a media stream reception module 228 for receiving one or more media streams from a media streaming server, remote from the electronic device 102;
  - a media application 104 for processing media streams for transmittal to an output device 206 and transmitting at least one of the prepared media streams to the presentation module 220 for transmittal to an output device 206, the media application including:
    - a first video player 229-1 for de-multiplexing, decrypting, decompressing, decoding, and/or rendering a first media stream for storage in a media content buffer 105 before transmittal to an output device 206;
    - a second video player 229-2 for de-multiplexing, decrypting, decompressing, decoding, and/or rendering a second media stream, distinct from the first media stream, for storage in a media content buffer 105 before transmittal to an output device 206; and
    - an audio switching module 230 for, in response to receiving a request to display a video stream other than the currently displayed video stream, determining audio data associated with the requested video stream; and changing the audio data currently being presented to match the newly requested video stream;
  - a preloading module 231 for, based on the media stream currently displayed, determining one or more video streams that need to be preloaded, and receiving video stream data for the determined one or more streams, and suspending the delivery of the one or more video streams; and
  - a bandwidth allocation module 232 for allocating the total download bandwidth when the electronic device 102 is downloading more than one media stream;
- an electronic device data module 240 for storing data, including but not limited to:
  - media content buffer(s) 105 including media stream content data received from a server system (e.g., server system 120, FIGS. 1) for one or more media streams and stored in the memory of the electronic device 102;
  - preloaded data 242 including but not limited to, audio and/or video data from one or more media streams, received from the appropriate media content server such as Video Data 1 243-1 (e.g., video data for Video Stream A in FIGS. 4A-4O), Video Data 2 243-2 (e.g., video data for Video Stream B in FIGS. 4A-4O), Video Data 3 243-3 (e.g., video data for Video Stream C in FIGS. 4A-4O) and, optionally, Other Data 244 such as still frames and/or audio data from one or more other video streams (e.g., Video Streams A, E-J and V-Z in FIG. 5O);
  - media content database 245 for storing, on the local device, media content that is part of the user's personal library of media content; and
  - a user profile database 246 including account information for a user of the electronic device 102 including user media history, user preferences, determined user interests, and account credentials.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, Memory 212 optionally stores a subset of the modules and data structures identified above. Furthermore, Memory 212 optionally stores additional modules and data structures not described above.

Figure 3:
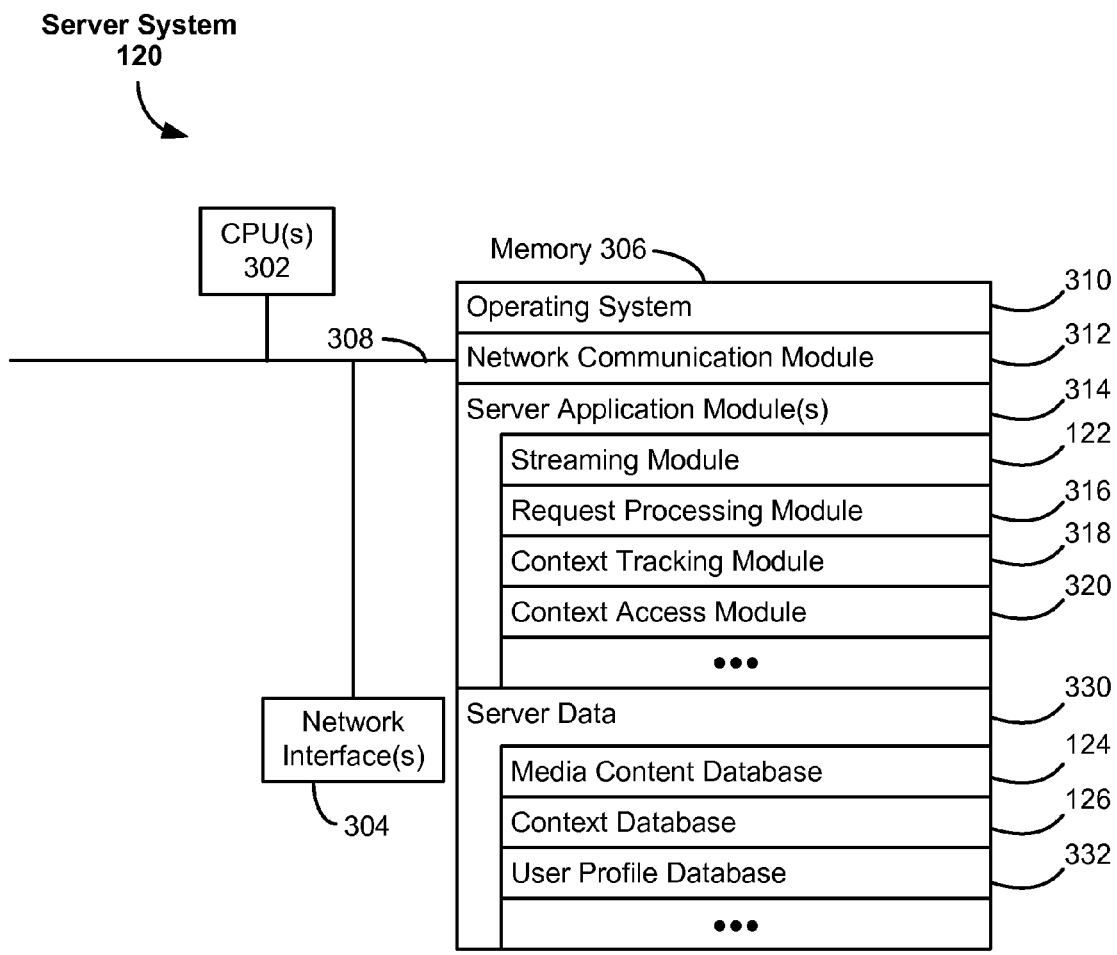
FIG. 3 is a block diagram illustrating a server system in accordance with some implementations.

FIG. 3 is a block diagram illustrating a server system 120, in accordance with some implementations. The server system 120 typically includes one or more processing units (CPUs) 302, one or more network interfaces 304, memory 306, and one or more communication buses 308 for interconnecting these components. Memory 306 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more communication network interfaces 304 (wired or wireless) and one or more communication networks, such as the Internet, other Wide Area Networks, Local Area Networks, Personal Area Networks, metropolitan area networks, VPNs, and so on;
- one or more server application module(s) 314 for enabling the server system 120 to perform the functions offered by the server system 120, including but not limited to:
  - a streaming module 122 for streaming media content to an electronic device (e.g., first and second electronic devices 102-n, 106-n, FIG. 1) remote from the sever system 120;
  - a request processing module 316 for receiving requests from electronic devices (e.g., first and/or second electronic devices 102, 106, FIG. 1), where the requests include requests to stream specific media content to the electronic devices and/or requests to change the destination of the media content stream from one electronic device to another electronic device;
  - a context tracking module 318 for tracking and storing the context of a media content stream, optionally including storing, among other data, one or more of the current playback position in a media content stream that is currently being presented by an electronic device (e.g., first and/or second electronic devices 102, 106, FIG. 1), the position in a current playlist, the play history of a user, the preferences of a user, previously skipped media content, whether media content items were "liked" or "disliked" (e.g., via "starred," "thumbs-up," and/or "thumbs-down" indications), and the like; and
  - a context access module 320 for allowing electronic devices (e.g., first and/or second electronic devices 102-n, 106-n, FIG. 1) associated with a given user account to access the current context for media content streams associated with the given user account; and
- one or more server data module(s) 330 for storing data related to the data server system 120, including but not limited to:
  - media content database 124 including media content and metadata describing the media content and enabling clients to search through the media content to identify media content;
  - a context database 126 including information associated with one or more media content streams (e.g., media content streams 114-1, 114-2, FIG. 2B), where context information optionally includes one or more of the current playback position in a media content stream, metadata relating to the media, a position in a playlist, play history of a user, user preferences, skipped media, and user settings; and
  - a user profile database 332 including account information for a plurality of users, where the account information for a respective user optionally includes a user media content request/playback history for the respective user, a list of electronic devices associated with the respective user, user preferences of the respective user, and determined user interests of the respective user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, Memory 306 optionally stores a subset of the modules and data structures identified above. Furthermore, Memory 306 optionally stores additional modules and data structures not described above.

Although FIG. 3 shows a "Server System" 120, FIG. 3 is intended more as functional description of the various features which may be present in a set of servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a Server System 120 and how features are allocated among them will vary from one implementation to another, and optionally depends in part on the amount of data traffic that the system must handle during peak usage periods as well as during average usage periods.

Figure 4A:
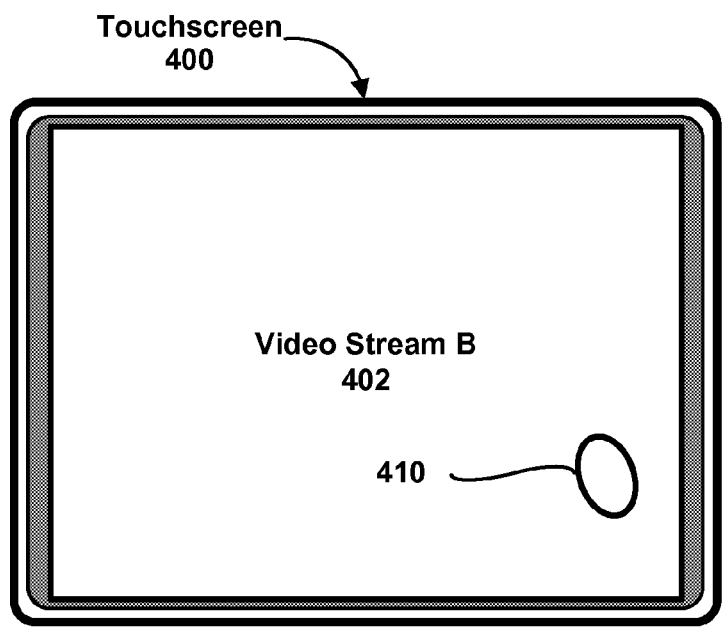
FIGS. 4A-4O illustrate exemplary user interfaces for switching between video channels in accordance with some implementations.

Attention is now directed towards implementations of user interfaces ("UI") and associated processes that are, optionally, implemented on an electronic device with a display and a touch-sensitive surface, such as electronic device 102. FIGS. 4A-4O illustrate exemplary user interfaces for swiping between video channels in accordance with some implementations. The user interfaces in these figures are used to illustrate the processes described below, including the processes in FIGS. 5, 6A-6H and 7A-7E.

Figure 4B:
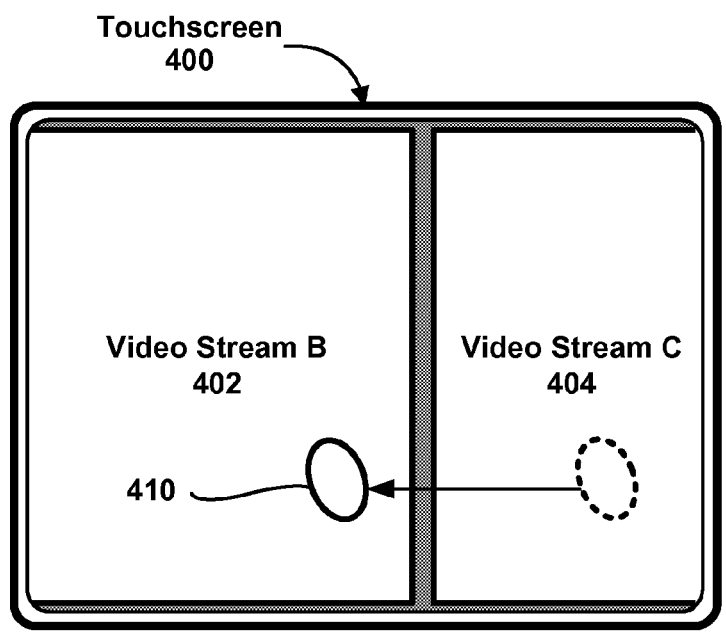

Attention is now directed towards FIGS. 4A-4B, which illustrates a touch screen 400 display of an electronic device (e.g., 102 in FIGS. 1 and 2). FIGS. 4A-4B illustrate exemplary user interfaces for transition between video channels. In some implementations, the touch screen display 400 presents a first video tile (e.g., a video tile that corresponds to Stream B 402 in FIGS. 4A-4O). As used herein, a video tile is a region of a user interface that displays content corresponding to a video stream (e.g., a still frame of video content, playing video content or the like). In some embodiments, a video tile is displayed at a stationary location on the display. In some embodiments, a video tile is configured to be moved across the display. The first video tile displays video content associated with a first media stream (e.g., Stream B 402). In FIGS. 4A-4O, Stream B 402 is adjacent to Stream A 403 and Stream C 404. In FIG. 4A the first video tile (e.g., a video tile that corresponds to Stream B 402 in FIGS. 4A-4O) is displayed at a first size. User input (e.g., contact 410 in FIGS. 4A and 4B) is detected at a first position (e.g., the position of contact 410 as shown in FIG. 4A) on the touchscreen display 400. In some implementations, detecting the user input (e.g., contact 410 in FIGS. 4A and 4B) includes detecting a finger contact on the touch screen surface 400. In some implementations, detecting the user input (e.g., contact 410 in FIGS. 4A and 4B) includes detecting a stylus contacting the touchscreen 400 surface. In other implementations, user input is the result of detecting a user finger or a stylus proximate to the touch screen but not in direct contact with it.

In some implementations, the first position (e.g., the position of contact 410 in FIG. 4A) of the user input (e.g., contact 410 in FIGS. 4A and 4B) is positioned above the first video tile (e.g., the video tile corresponding to Stream B 402 in FIGS. 4A-4O) currently displaying the first video stream (e.g., Stream B 402 in FIG. 4A). In some implementations, the detected first input moves from a first position (e.g., the position of contact 410 in FIG. 4A) to a second position (e.g., the position of contact 410 in FIG. 4B) on the touchscreen 400 in FIGS. 4A and 4B.

In some implementations, in response to detecting movement of the detected user input (e.g., contact 410 in FIGS. 4A and 4B) from a first position (e.g., the position of 410 as shown in FIG. 4A) to a second position (e.g., the position of 410 as shown in FIG. 4B), the electronic device slides the first video tile (e.g., the video tile corresponding to Stream B 402 in FIGS. 4A and 4B) off the display and, at the same time, slides a second video tile (e.g., the video tile corresponding to Stream C 404 in FIG. 4B) onto the touchscreen display 400. In some implementations, the first video tile and the second video tile move proportionally with the movement of the user input (e.g., the movement of contact 410 in FIGS. 4A and 4B).

In some implementations, the first video stream (e.g., Stream B 402 in FIGS. 4A and 4B) continues to play video content as it slides off the display (e.g., as shown in FIG. 4B) and the second video stream (e.g., Stream C 404 in FIG. 4B) plays video content as it slides onto the display (e.g., as shown in FIG. 4B).

Figure 4C:
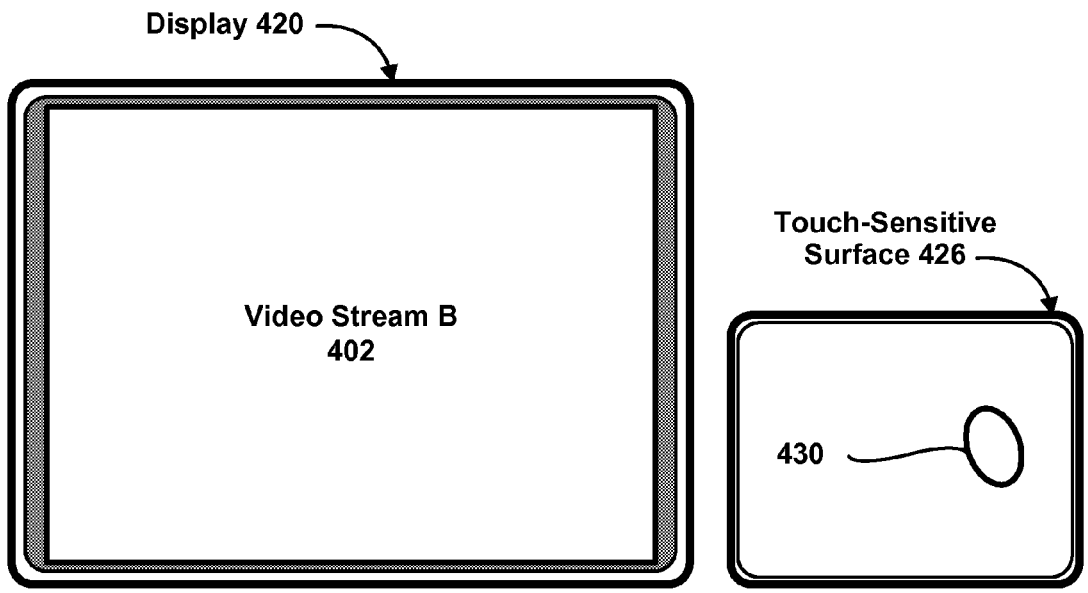
Figure 4D:
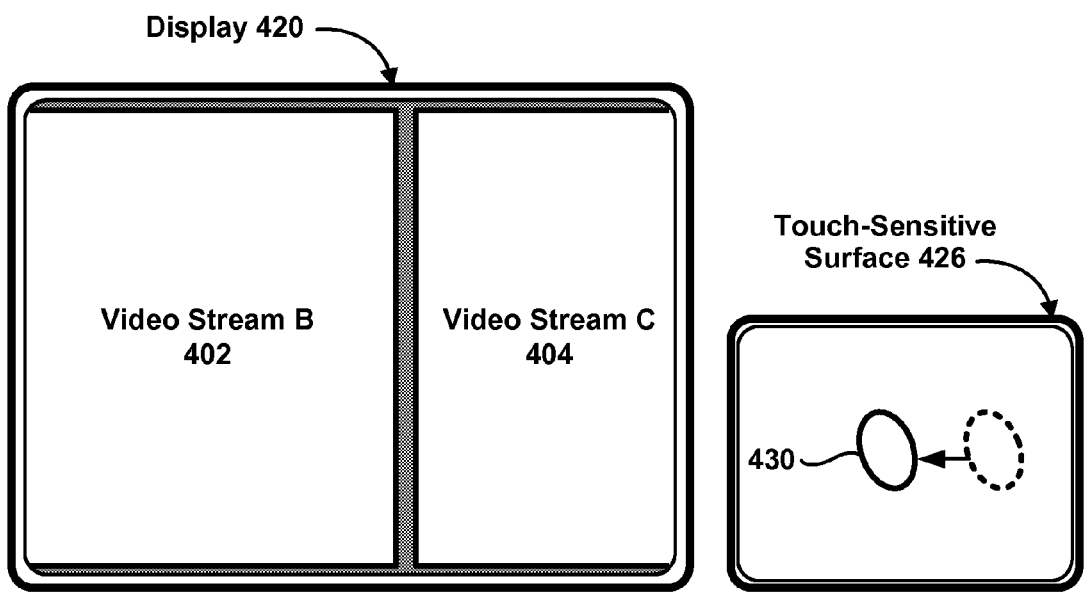

Attention is now directed towards FIGS. 4C-4D, which illustrates a display 420 and a touch-sensitive surface 426 associated with an electronic device (e.g., 102 in FIGS. 1 and 2). In some implementations, the touch-sensitive surface is a touchpad, a touch sensitive display on a second device distinct from the electronic device, or other input device with a surface that is touch sensitive 426 as shown in FIGS. 4C and 4D. FIGS. 4C-4D illustrates exemplary user interfaces for transition between video channels. In some implementations, the display 420 presents a first video stream (e.g., Stream B 402 in FIGS. 4C and 4D). User input (e.g., contact 430 in FIGS. 4C and 4D) is detected at a first position (e.g., the position of contact 430 as shown in FIG. 4C) on the touch-sensitive surface 426. In some implementations, the detected user input (e.g., contact 430 in FIGS. 4C and 4D) is made with a direct user finger contact on the touch-sensitive surface 426. In some implementations, the detected user input (e.g., contact 430 in FIGS. 4C and 4D) is made by a stylus contacting the touch-sensitive surface 426. In other implementations, user input (e.g., contact 430 in FIGS. 4C and 4D) is detected based on a user finger or a stylus proximate to the touch-sensitive surface 426 but not in direct contact with the touch-sensitive surface 426.

In some implementations, the first position (e.g., the position of contact 430 in FIG. 4A) of the detected user input (e.g., contact 430) is detected at a position on the touch-sensitive surface 426 that corresponds to the position of the first video tile on the display 420 as shown in FIG. 4C. In some implementations, the detected first input (e.g., contact 430 as shown in FIGS. 4C and 4D) moves from a first position (e.g., the position of 430 as shown in FIG. 4C) on the touch-sensitive surface 426 to a second position (e.g., the position of contact 430 as shown seen in FIG. 4D) on the touch-sensitive surface 426.

In some implementations, in response to detecting movement of the detected user input (e.g., contact 430 in FIGS. 4C and 4D) from a first position (e.g., the position of contact 430 as shown in FIG. 4C) on the touch-sensitive surface 426 to a second position (e.g., the position of contact 430 as shown in FIG. 4D) on the touch-sensitive surface 426, the electronic device (e.g., 102 from FIGS. 1 and 2) slides the first video tile (e.g., the video tile corresponding to Stream B 402 in FIGS. 4C and 4D) in a first direction and at least partially off the display and slides a second video tile (e.g., the video tile corresponding to Stream C 404 in FIG. 4D) at least partially onto the display 420.

In some implementations, the first video stream (e.g., Stream B 402 in FIGS. 4C and 4D) continues to play video content as it slides off the display 420 (e.g., as shown in FIG. 4D) and the second video stream (e.g., Stream C 404 in FIG. 4D) plays video content as it slides onto the display 420 (e.g., as shown in FIG. 4D).

Figure 4E:
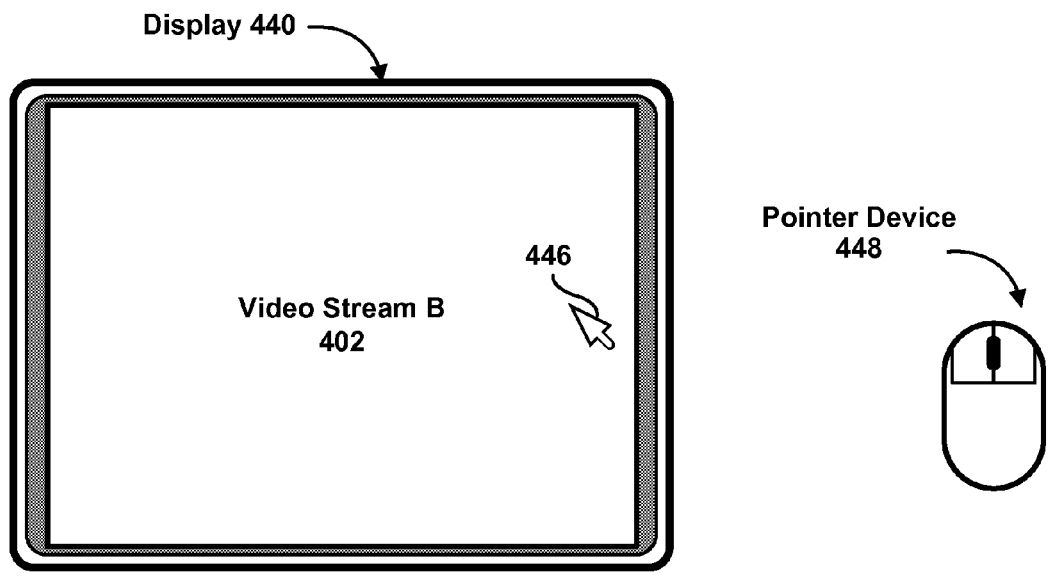
Figure 4F:
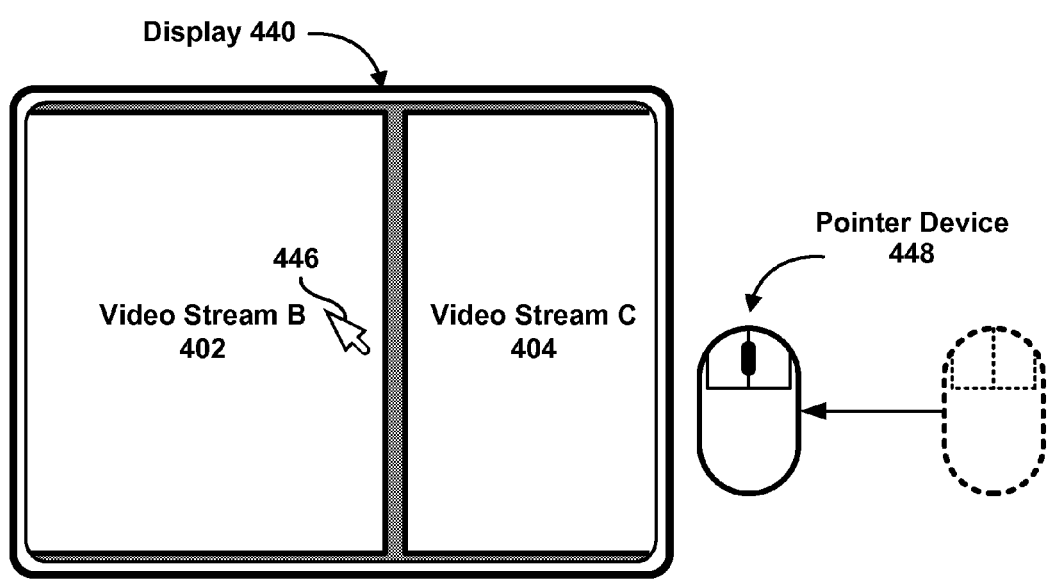

Attention is now directed towards FIGS. 4E-4F, which illustrates a display 440 and a pointer device (e.g., mouse 448 as shown in FIG. 4E and 4F) associated with an electronic device (e.g., 102 in FIGS. 1 and 2). In some implementations, the pointer device is a mouse, joy stick, or an inertial pointer device. FIGS. 4E and 4F illustrate exemplary user interfaces for transition between video channels using a pointer device (e.g., mouse 448 as shown in FIG. 4E and 4F). In some implementations, the display 440 presents a first video stream (e.g., Stream B 402 as shown in FIGS. 4E and 4F). A user controls a pointer device (e.g. pointer device 448) to move a cursor 446 on a display 440. In some implementations, user input (e.g., a mouse click or other selection input) is detected while the cursor 446 is at a first position (e.g., the position of cursor 446 as shown in FIG. 4E) on the display 440.

In some implementations, the first position (e.g., the position of cursor 446 in FIG. 4E) of the cursor 446 at the time the user input is detected above the area of the display 440 on which the first video tile (e.g., a video tile corresponding to Stream B 402 as shown in FIGS. 4E and 4F) is currently displayed. In some implementations, the cursor 446 moves from a first position (e.g., the position of cursor 446 as shown in FIG. 4E) on the display 440 to a second position (e.g., the position of cursor 446 as shown in FIG. 4F) on the display 440.

In some implementations, in response to detecting movement of the cursor 446 from a first position (e.g., the position of cursor 446 as shown in FIG. 4E) on the display 440 to a second position (e.g., the position of cursor 446 as shown in FIG. 4F) on the display 440, the electronic device (e.g., 102 from FIGS. 1 and 2) slides the first video tile (e.g., a video tile corresponding to Stream B 402 in FIGS. 4E and 4F) in a first direction and at least partially off the display 440 and slides a second video tile (e.g., a video tile corresponding to Stream C 404 in FIG. 4F) at least partially onto the display 440.

In some implementations, the first video tile (e.g., a video tile corresponding to Stream B 402 in FIGS. 4E and 4F) continues to display video content as it slides off the display 440 (e.g., as shown in FIG. 4F) and the second video tile (e.g., a video tile corresponding to Stream C 404 in FIG. 4F) displays video content as it slides onto the display 440 (e.g., as shown in FIG. 4F).

Figure 4G:
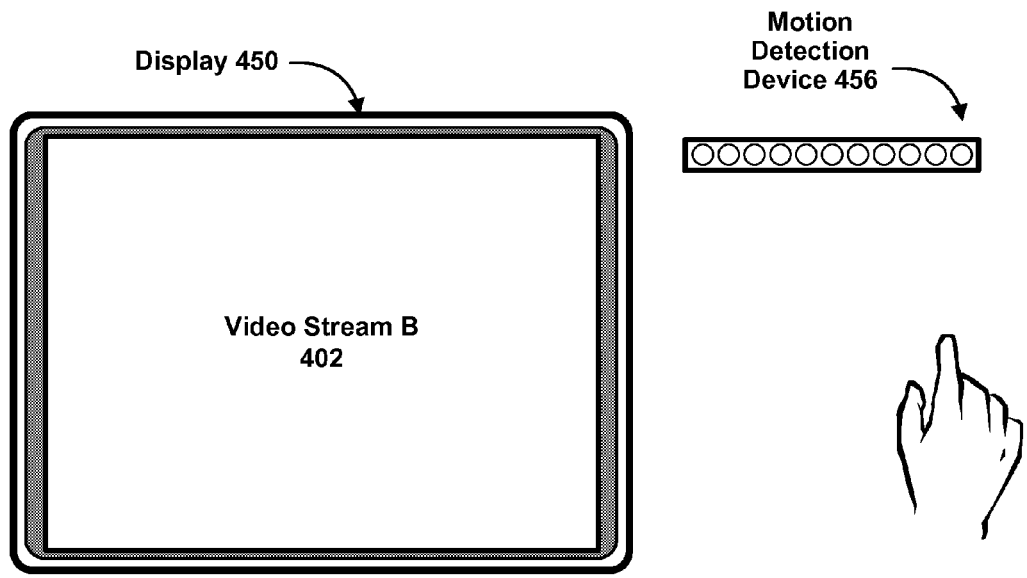
Figure 4H:
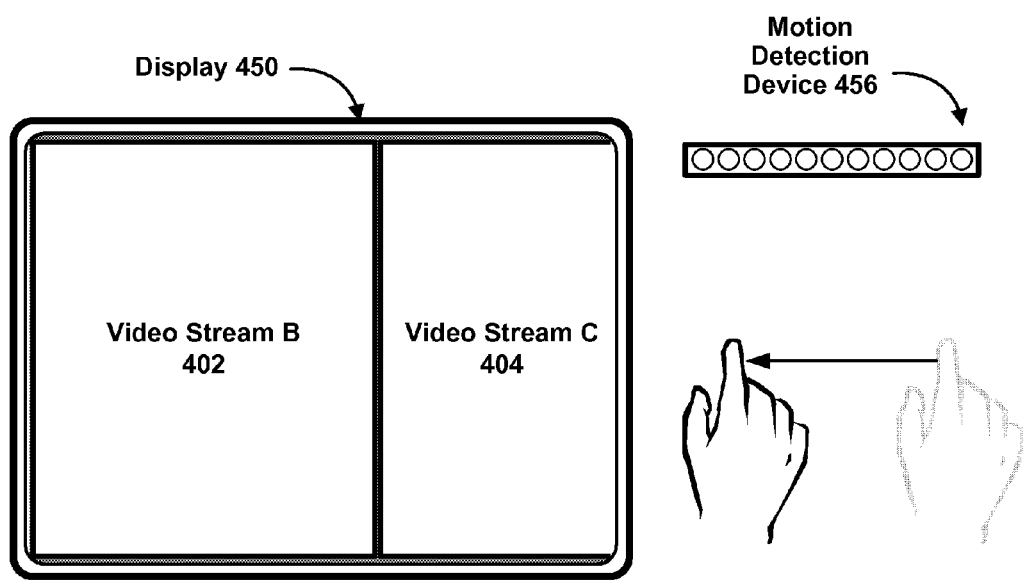

Attention is now directed towards FIGS. 4G-4H, which illustrates a display (e.g., display 450 as shown in FIGS. 4G and 4H) and a motion detection device (e.g., infrared light bar 456 as shown in FIGS. 4G and 4H) associated with an electronic device (e.g., 102 in FIGS. 1 and 2). In some implementations, the motion detection device 456 is configured to detect motion of an object in three dimensional space (e.g., movement of user's hand) and to convert the detected motion to input useable by the electronic device (e.g., 102 in FIGS. 1 and 2). FIGS. 4G and 4H illustrate exemplary user interfaces for transition between video channels using a motion detection device 456. In some implementations, the display 450 displays a first video tile (e.g., Stream B 402 as shown in FIGS. 4G and 4H). The motion detection device 456 detects the motion of a user (e.g., a hand gesture, facial movement, or other detectable user motion) from a first position (e.g., shown in FIG. 4G) to a second position (e.g., shown in FIG. 4H). For example, motion detection device 456 measures movement of a user from across a relatively large distance, such as across a typical room (e.g., 5, 10, 15 or 20 feet), so that a user can control a media presentation device (e.g., a television or speaker system) by gesturing in the air with their hands and/or bodies within view of motion detection device 456.

In some implementations, in response to detecting user motion from a first position (e.g., shown in FIG. 4G) to a second position (e.g., shown in FIG. 4H), the electronic device (e.g., 102 from FIGS. 1 and 2) slides the first video tile (e.g., the video tile corresponding to Stream B 402 in FIGS. 4G and 4H) in a first direction and at least partially off the display (e.g., 450 in FIGS. 4G and 4H) and slides a second video tile (e.g., the video tile corresponding to Stream C 404 in FIG. 4H) at least partially onto the display 450.

In some implementations, the first video tile (e.g., a video tile corresponding to Stream B 452 in FIGS. 4G and 4H) continues to play video content as it slides off the display 450 (e.g., as shown in FIG. 4H) and the second video tile (e.g., a video tile corresponding to Stream C 454 in FIG. 4H) plays video content as it slides onto the display 450 (e.g., as shown in FIG. 4H).

FIGS. 4I-4L illustrate exemplary user interfaces for switching between non-adjacent playing video channels in accordance with some implementations. The user interfaces in these figures are used to illustrate the processes described below, including the processes in FIGS. 7A-7E.

Figure 4I:
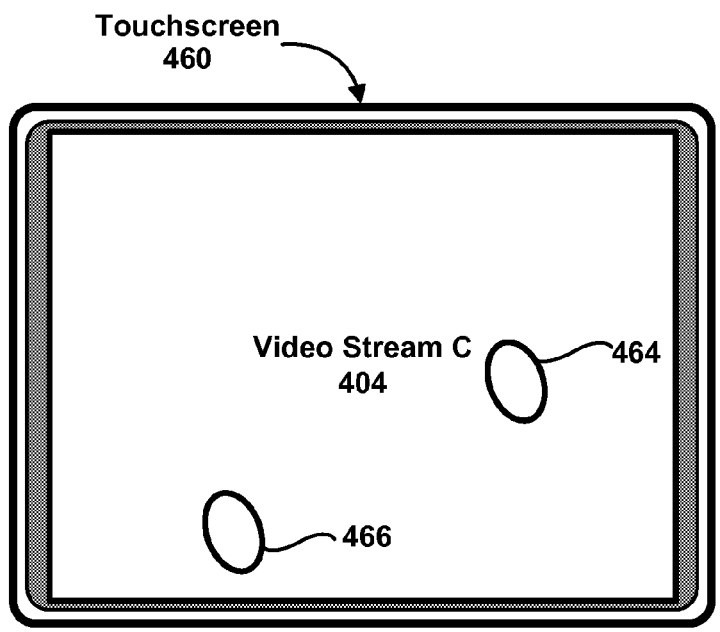
Figure 4J:
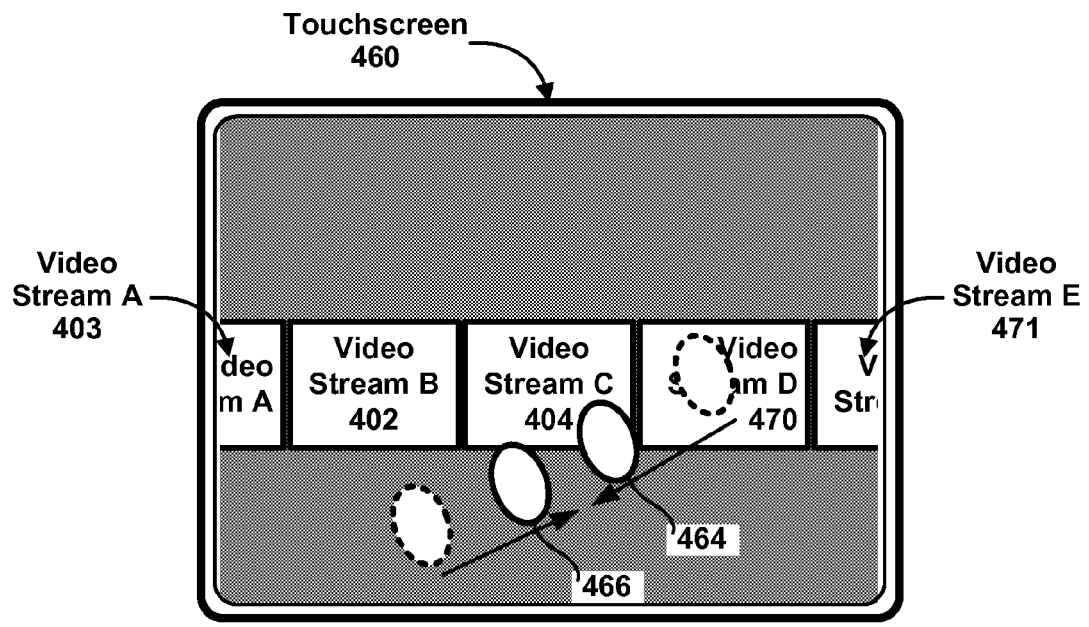
Figure 4K:
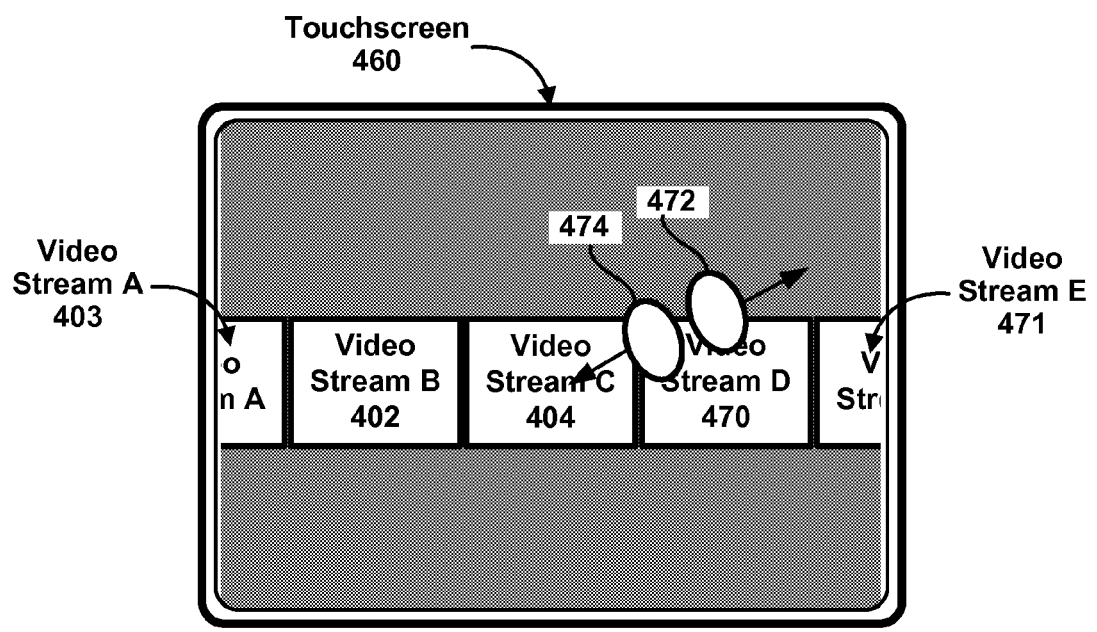

In some implementations, a first video stream (e.g., Stream C 404 as shown in FIGS. 4I-4K) is displayed on a touchscreen display (e.g., touchscreen 460 as shown in FIGS. 4I-4L). While displaying the first video tile (e.g., a video tile corresponding to Stream C 462 as shown in FIGS. 4I-4K) at a first size, a first contact 464 and a second contact 466 are detected. The first video tile displays video content associated with Video Stream C. In some implementations, the electronic device (e.g., 102 in FIGS. 1 and 2) detects the first contact 464 and the second contact 466 moving closer together (e.g., as shown in FIG. 4J). In some implementations, when the electronic device (e.g., 102 in FIGS. 1 and 2) detects the first contact 464 and the second contact 466 moving closer together (e.g., as shown in FIG. 4J), the device zooms out (e.g., as shown in FIG. 4J) to display one or more additional video tiles (e.g., video tiles corresponding to Stream B 402 and Stream D 470 as shown in FIGS. 4J and 4K) at a second size, smaller than the first size. In some implementations, all the video tiles (e.g., video tiles corresponding to Stream A 403, Stream B 402, Stream C 404, Stream D 470, and Stream E 471) are represented in an ordered list of video tiles and when display of the first video tile (e.g., Stream C 404 as shown in FIGS. 4I-4K) zooms out, the plurality of video tiles (e.g., Stream B 402, Stream D 470 as show in FIGS. 4J and 4K) are shown in the order in which they are listed, with the first video tile (e.g., Stream C 404 as shown in FIGS. 4I-4K) in the center.

In some implementations, when the plurality of video tiles (e.g., Stream B 402, Stream D 470 as show in FIGS. 4J and 4K) are shown in an ordered list (e.g., Stream B 402, Stream C 404, Stream D 470 as shown in FIGS. 4J and 4K), the list is, optionally, traversed in response to a swipe gesture on the touch screen display (e.g., while displayed at the reduced size, the row of video tiles are, optionally, enabled to be scrolled to the right or to the left in analogous manner to the scrolling described above with reference to FIGS. 4A-4B).

Figure 4L:
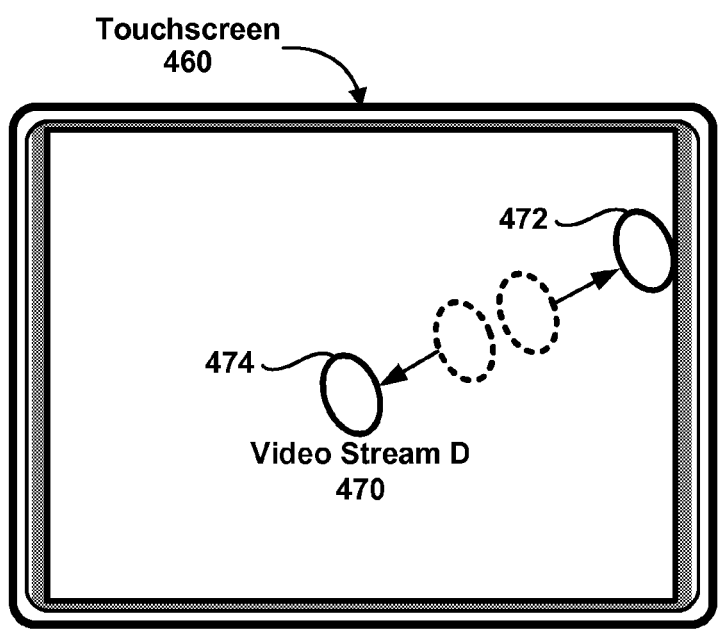

In some implementations, while displaying the zoomed out ordered list of video streams (e.g., Stream B 402, Stream C 404, Stream D 470, and Stream D 471 as shown in FIGS. 4J and 4K), the electronic device (e.g., 102 in FIGS. 1 and 2) detects third user contact 472 and a fourth user contact 474 as shown in FIGS. 4K and 4L. The third user contact 472 and a fourth user contact 474 move apart in an depinch gesture (e.g., as shown in FIGS. 4K and 4L). In response to the depinch gesture, the electronic device (e.g., 102 in FIGS. 1 and 2) determines the video stream closest to the first position of the third user contact and the first position of the fourth user contact. In response, the determined video stream is enlarged or zoomed in to be displayed on the touchscreen display (e.g., a video tile corresponding to Stream D 470 is enlarged on touchscreen 460, as shown in FIG. 4L).

Figure 4M:
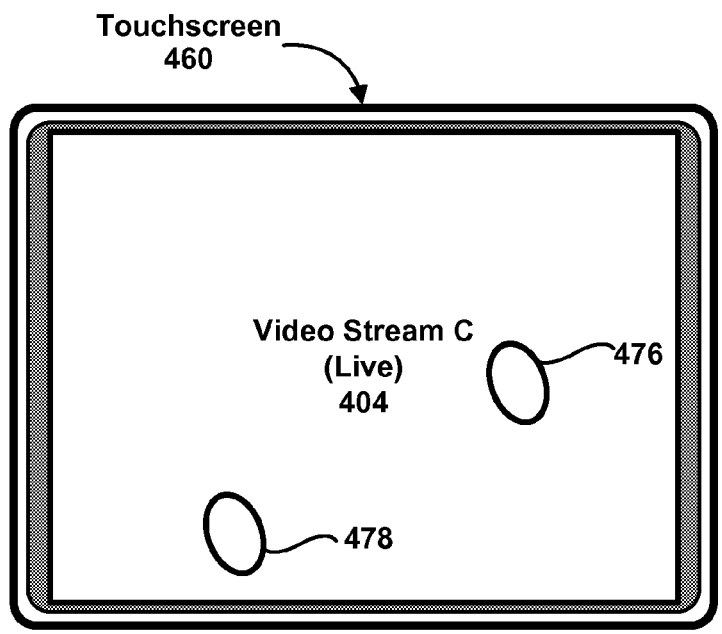
Figure 4N:
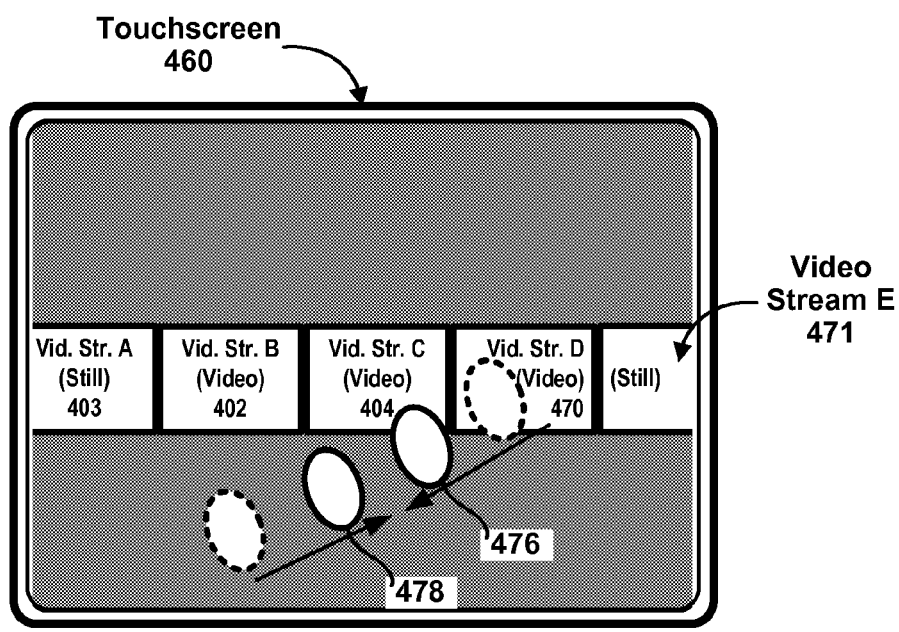
Figure 4O:
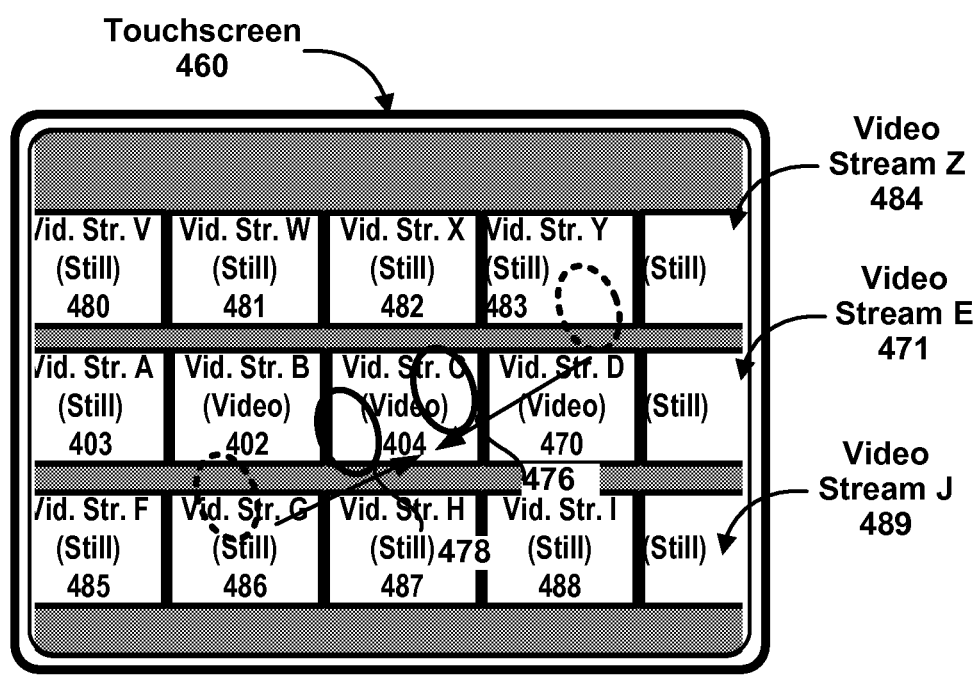

FIGS. 4M-4O illustrate exemplary user interfaces for displaying live video streams and still images in reduced size tiles in accordance with some implementations. The user interfaces in these figures are used to illustrate the processes described below.

In some implementations, a first video stream is displayed in a first video tile (e.g., Stream C 404 as shown in FIGS. 4M-4O) that is displayed on a touchscreen display (e.g., touchscreen 460 as shown in FIGS. 4M-4O). In some implementations, a resizing input such as a pinch gesture is detected (e.g., movement of first contact 476 and second contact 478 toward each other in FIGS. 4M-4N and 4M, 4O). In response to detecting the pinch gesture shown in FIGS. 4M-4N and 4M, 4O, the touchscreen display 460 zooms out to display, at a reduced size, one or more video tiles (e.g., video tiles corresponding to Stream A 403, Stream B 402, Stream C 404, Stream D 470, and Stream E 471 as shown in FIG. 4N, and Streams A-J and V-Z in FIG. 4O). In some implementations, one or more of the reduced size video tiles displays a video stream (e.g., the video tiles for Video Stream B 402, Video Stream C 404, and Video Stream D 470 in FIGS. 4N and 4O include playing video streams) and one or more of the reduced size video tiles display still images (e.g., the video tiles Video Stream A 403 and Video Stream E 471 in FIG. 4N and Video Streams A, E-J and V-Z in FIG. 4O show still images that correspond to recent representative frames of the video streams). Displaying video in some video tiles while displaying still images in other video tiles provides the user with information about a number of different video streams (e.g., a preview of content corresponding to the different video streams) without using the bandwidth or processing resources to download and decode a large number of video streams simultaneously. In some embodiments the number of video tiles that display video (e.g., as opposed to still images) is determined based on an available amount of bandwidth (e.g., if there is a high amount of available bandwidth, a large number of video tiles display video streams, while if there is a low amount of available bandwidth, a smaller number of video tiles display video streams).

In some implementations, when the touch screen display 460 zooms out, the one or more additional, reduced size video tiles are displayed in a single row (e.g., FIG. 4N) that is optionally scrollable (e.g., in response to detecting a left-to-right or right-to-left gesture). In some implementations, when the touch screen display 460 zooms out, the one or more additional, reduced size video tiles are displayed in a grid, with multiple rows and multiple columns (e.g., as shown in FIG. 4O). In some implementations, the rows and columns are fixed in a grid arrangement. In some implementations, each row (or column) is enabled to be scrolled independently to display additional video tiles (e.g., a respective row is scrolled to the right or left in response to detecting a left-to-right or right-to-left gesture that corresponds to the respective row).

The user interfaces described above with reference to FIGS. 4A-4O provide convenient and intuitive user interfaces by playing multiple video streams for the user simultaneously. This provides the user with the appearance that a large number (or all) of the video streams are being simultaneously downloaded/streamed and prepared for viewing by the user. However, in many situations, the device has a low-bandwidth connection and is unable to download/streamed (and/or process) a large number of video streams simultaneously. Thus, it is sometimes advantageous to download/stream and/or process a limited number of video streams while maintaining the appearance that a larger number of video streams are being downloaded/streamed and/or processed, so as to conserve network bandwidth and device processing resources without degrading the user experience. FIGS. 5, 6A-6H, and 7A-7E provide examples of systems and methods for conserving network bandwidth and device processing resources while maintaining a user experience of immediate access to a large number of different video streams.

Figure 5:
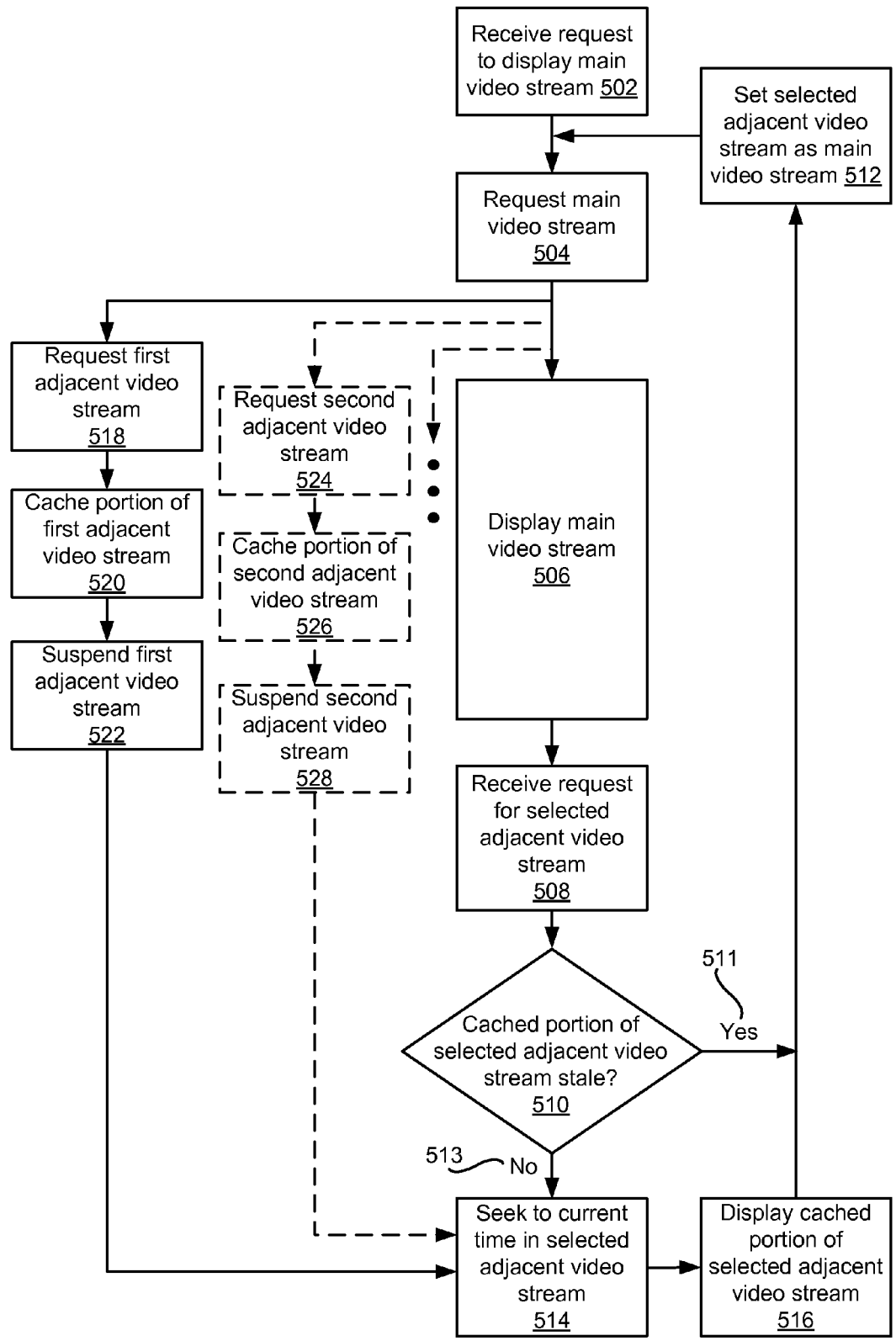
FIG. 5 is a flow diagram illustrating a method of switching between video streams, in accordance with some implementations.
Figure 6A:
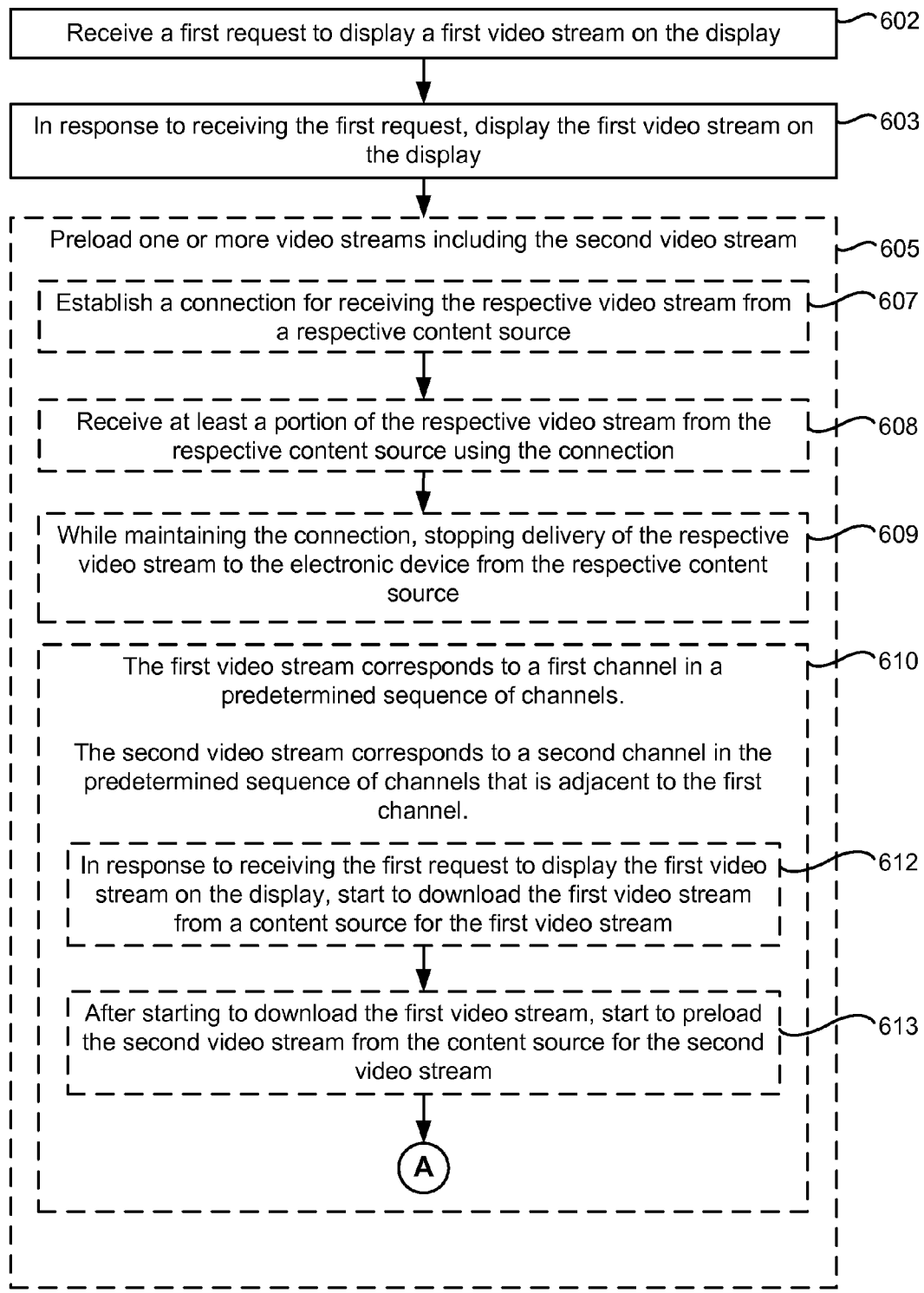
FIGS. 6A-6H are flow diagrams illustrating a method of switching from a first video stream to an adjacent second video stream, in accordance with some implementations.
Figure 6B:
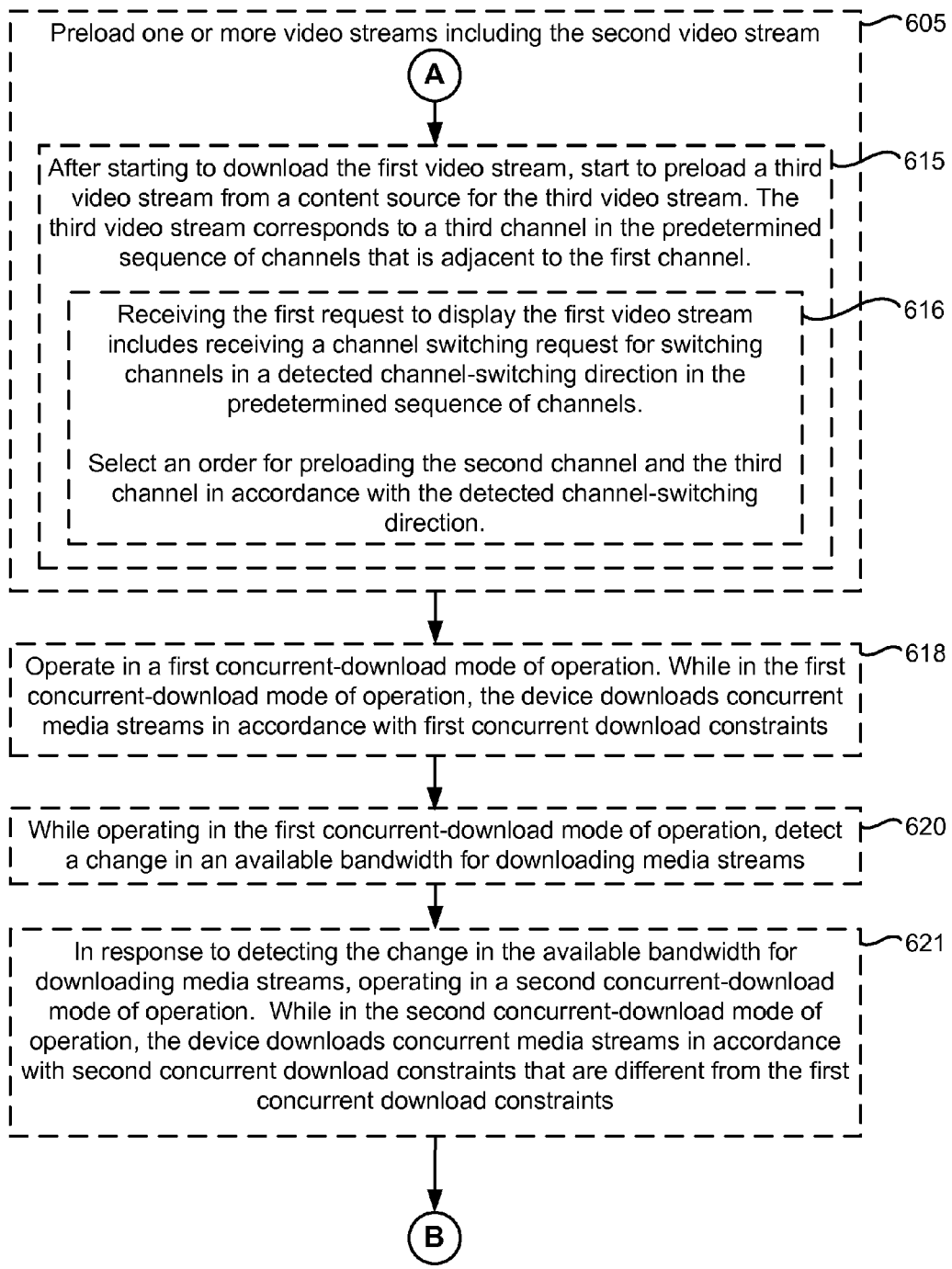
Figure 6C:
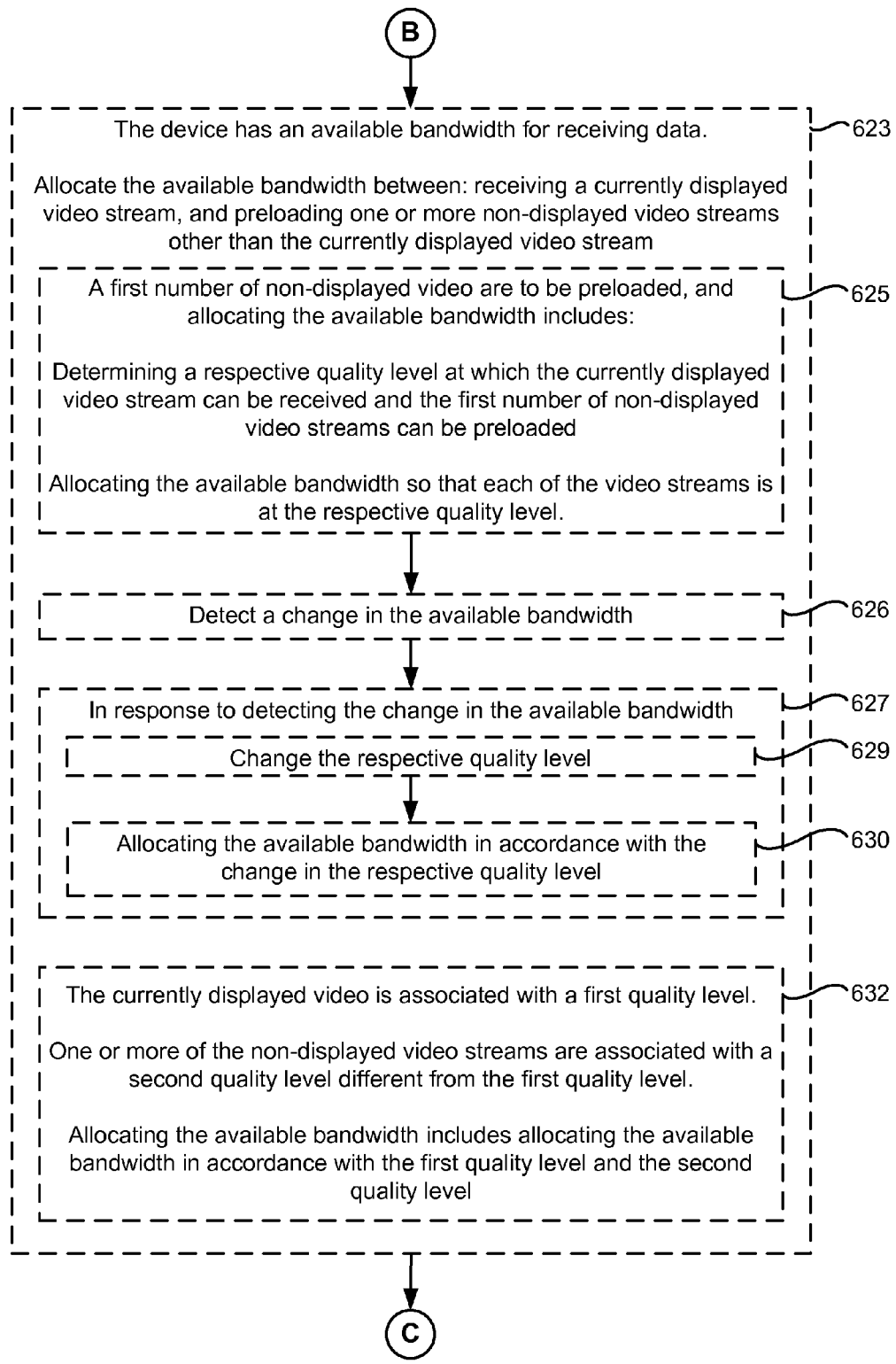
Figure 6D:
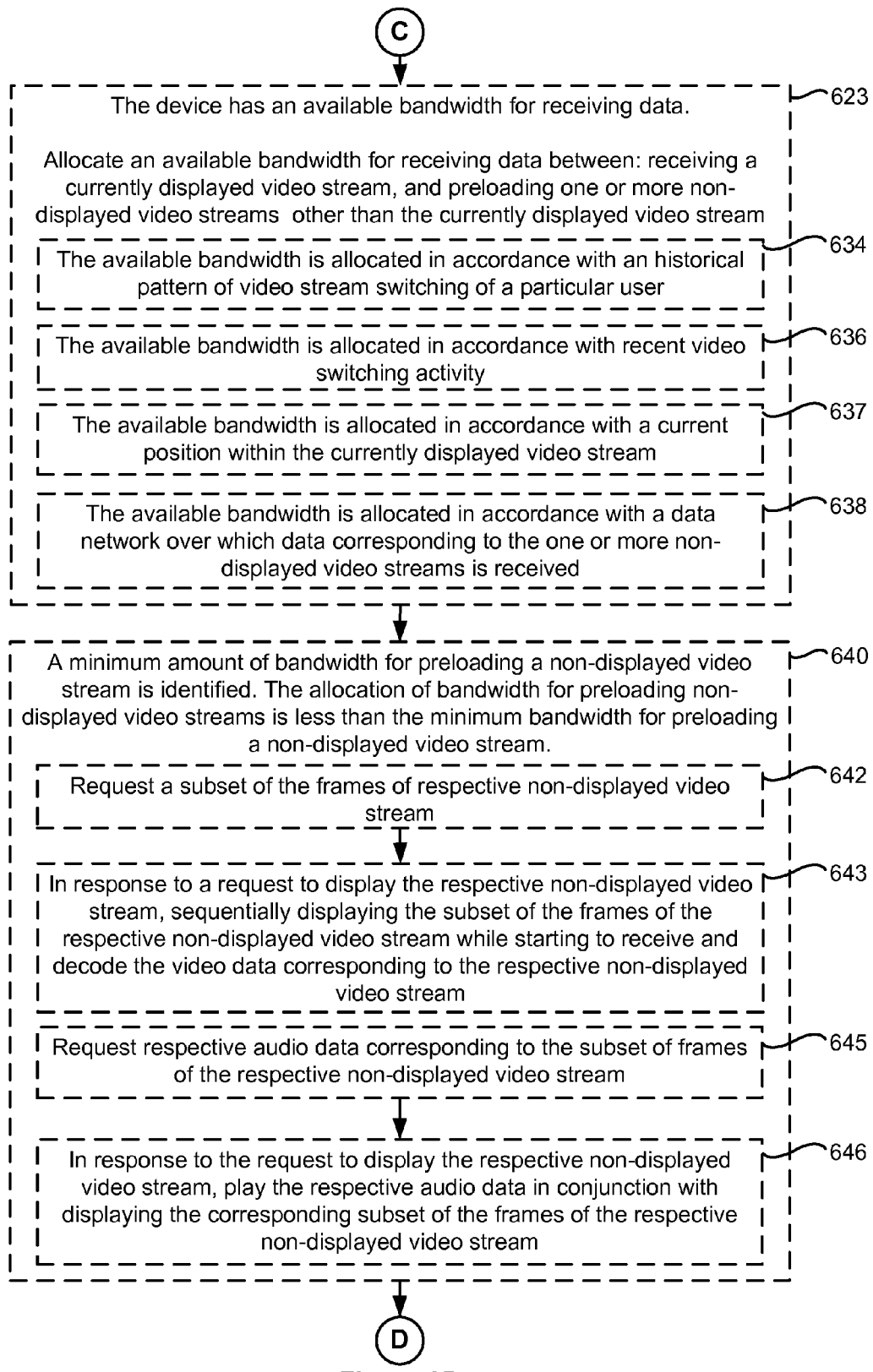
Figure 6E:
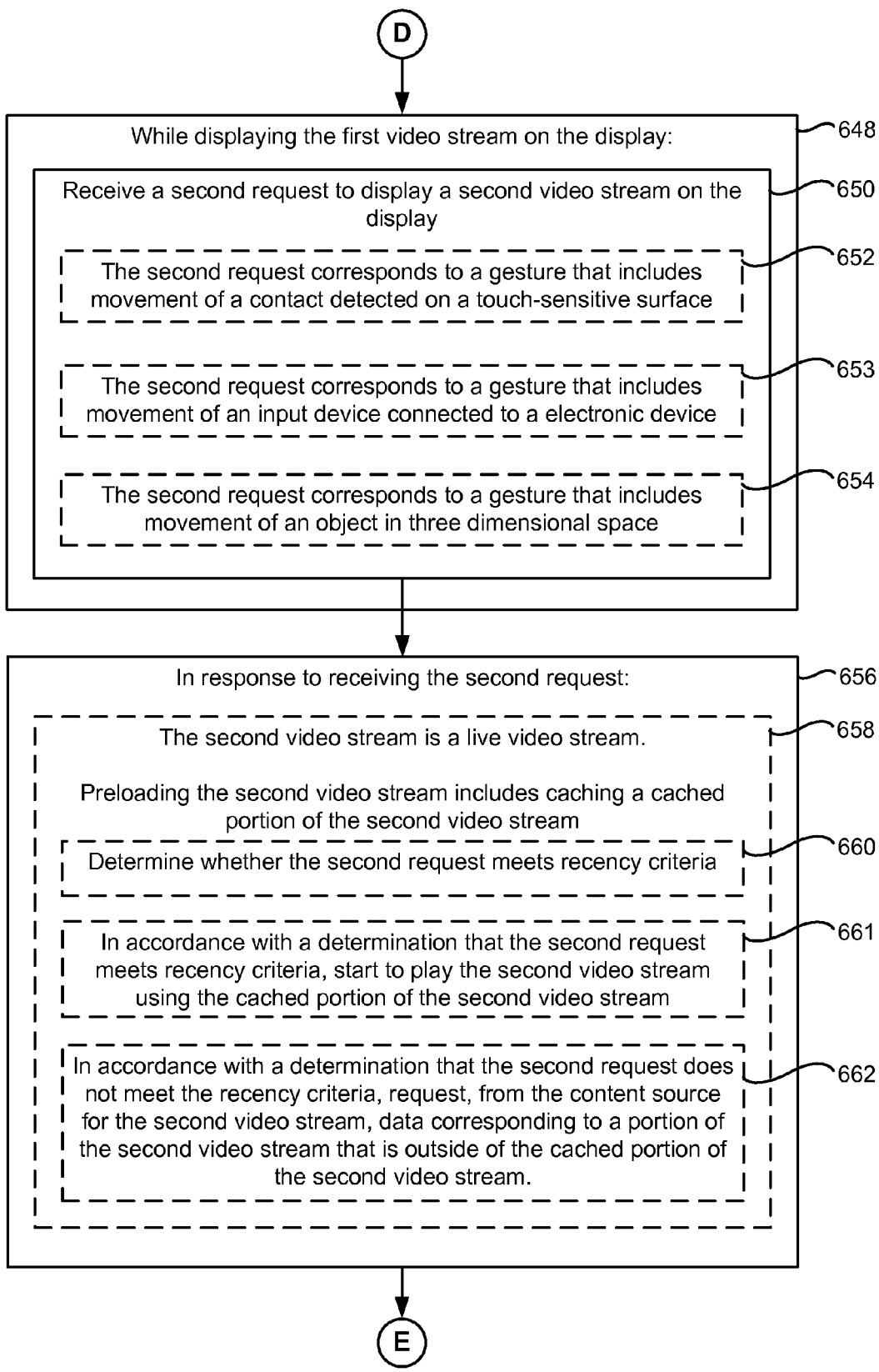
Figure 6F:
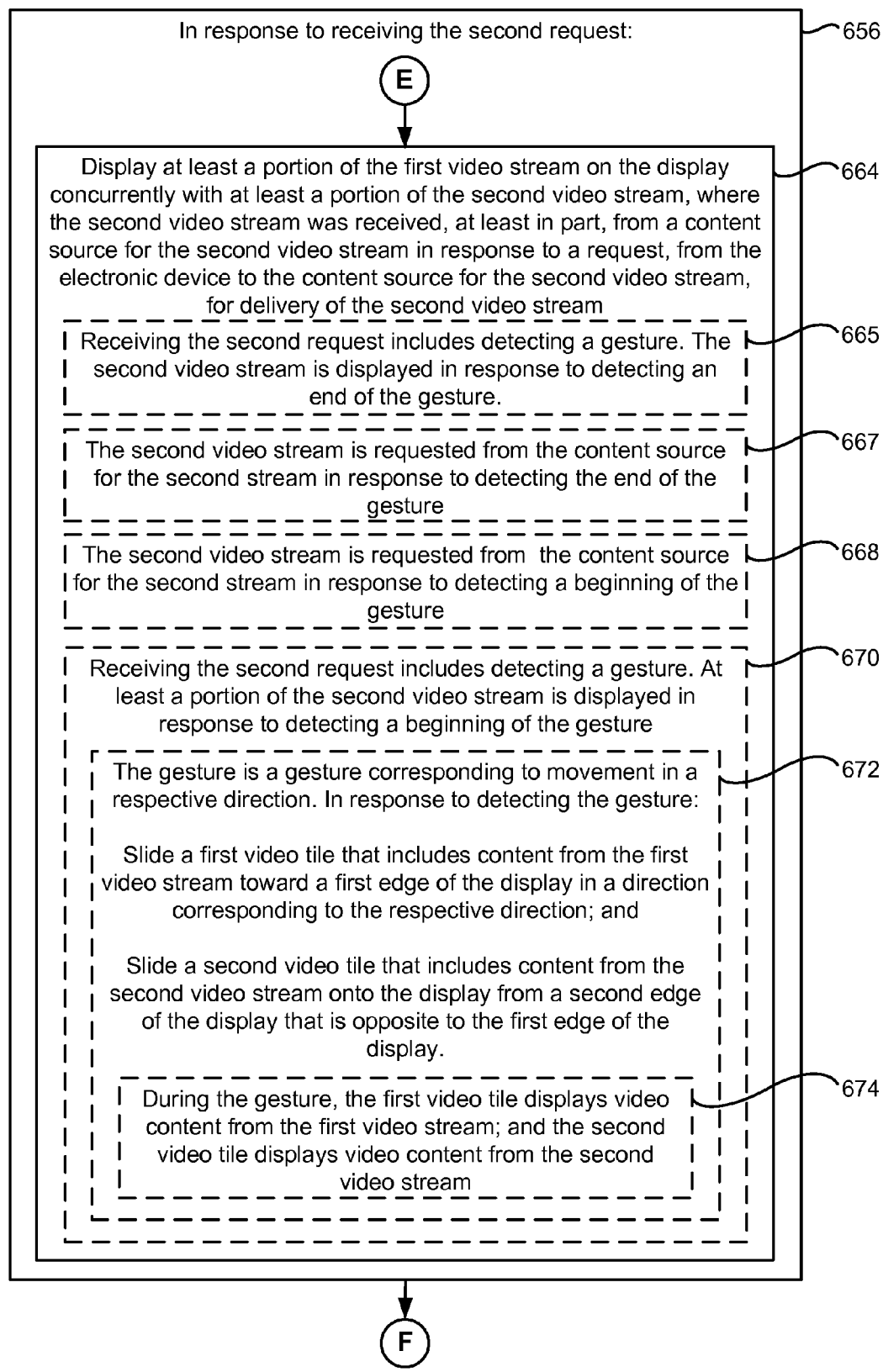
Figure 6G:
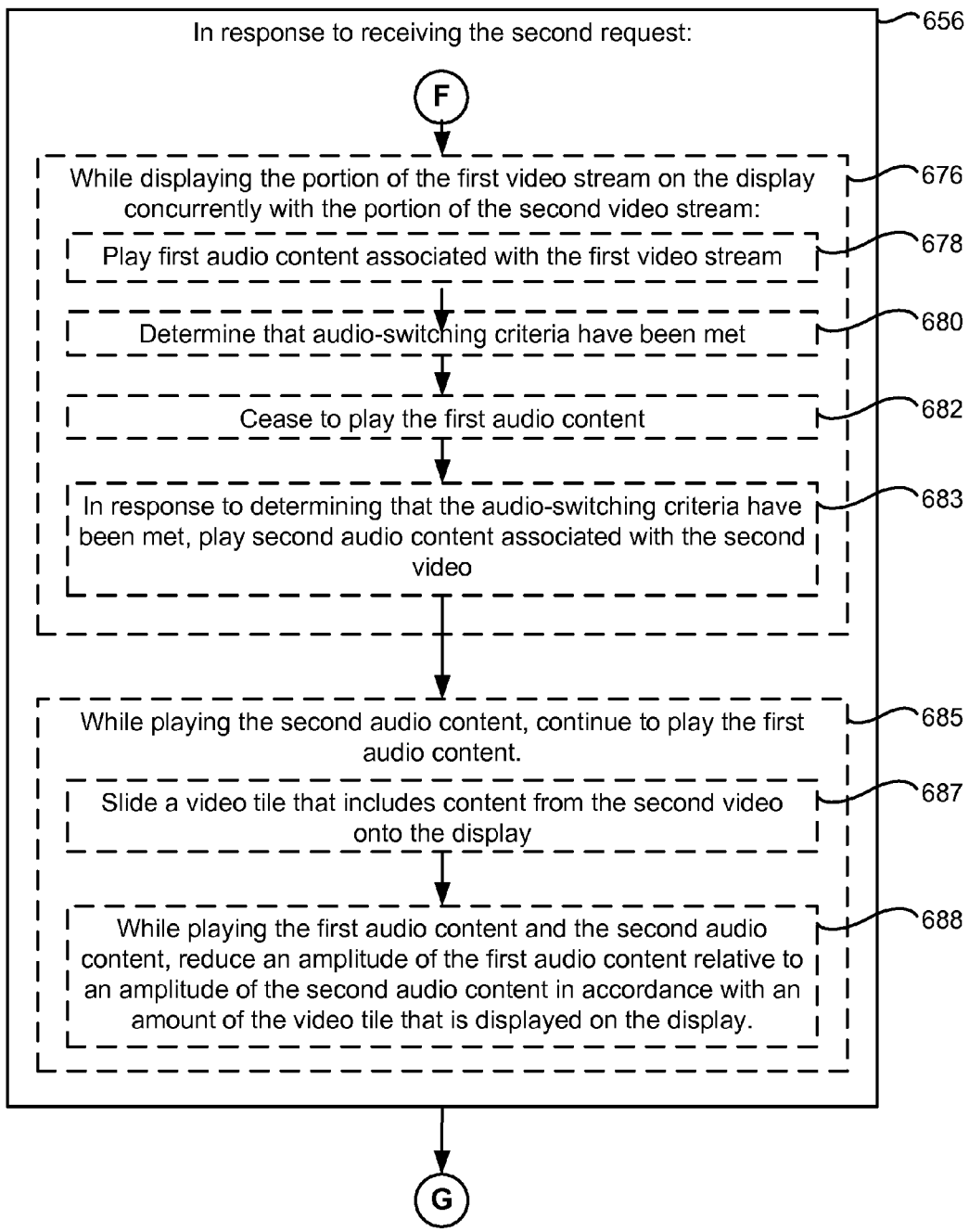
Figure 6H:
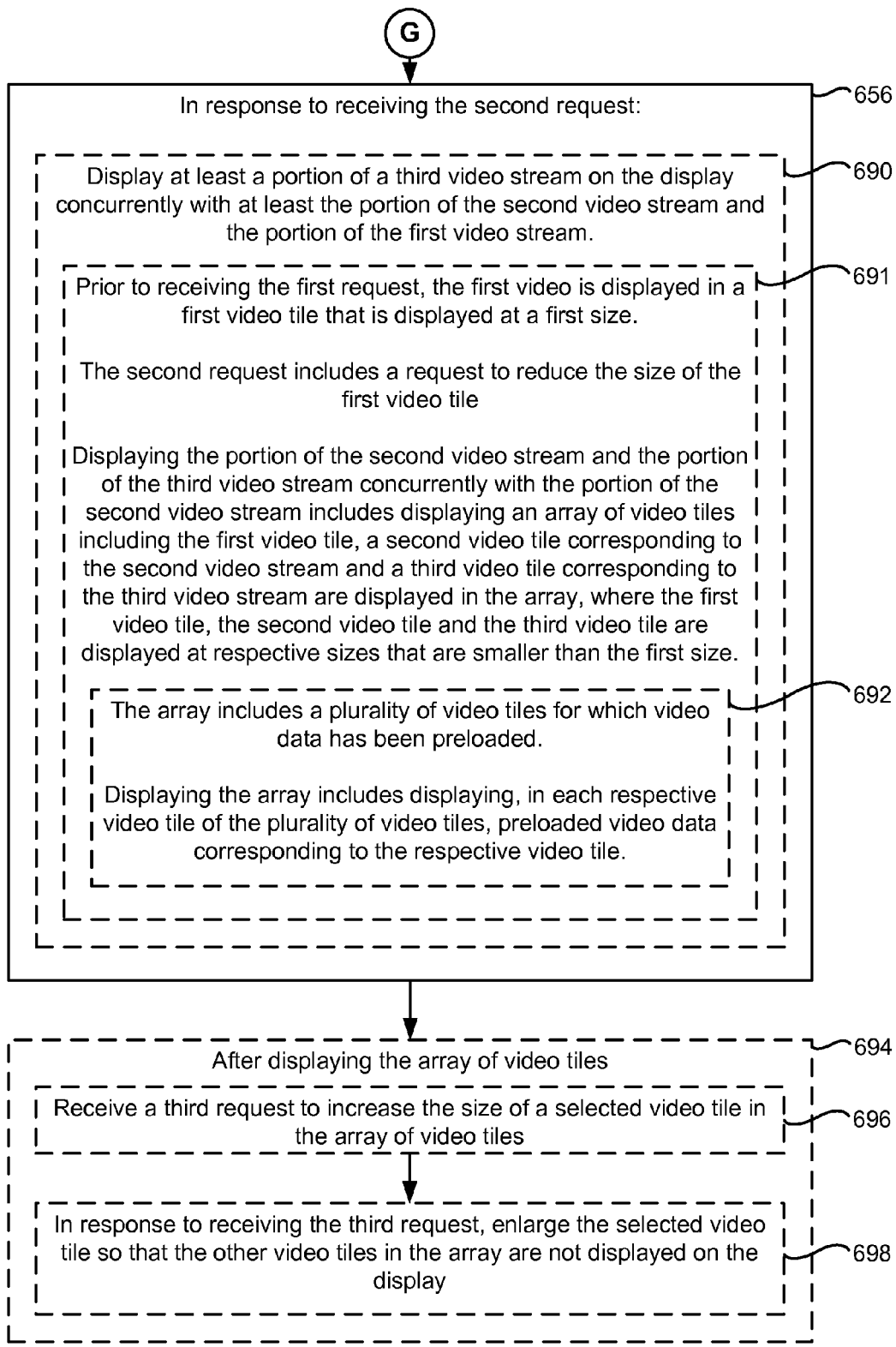
Figure 7A:
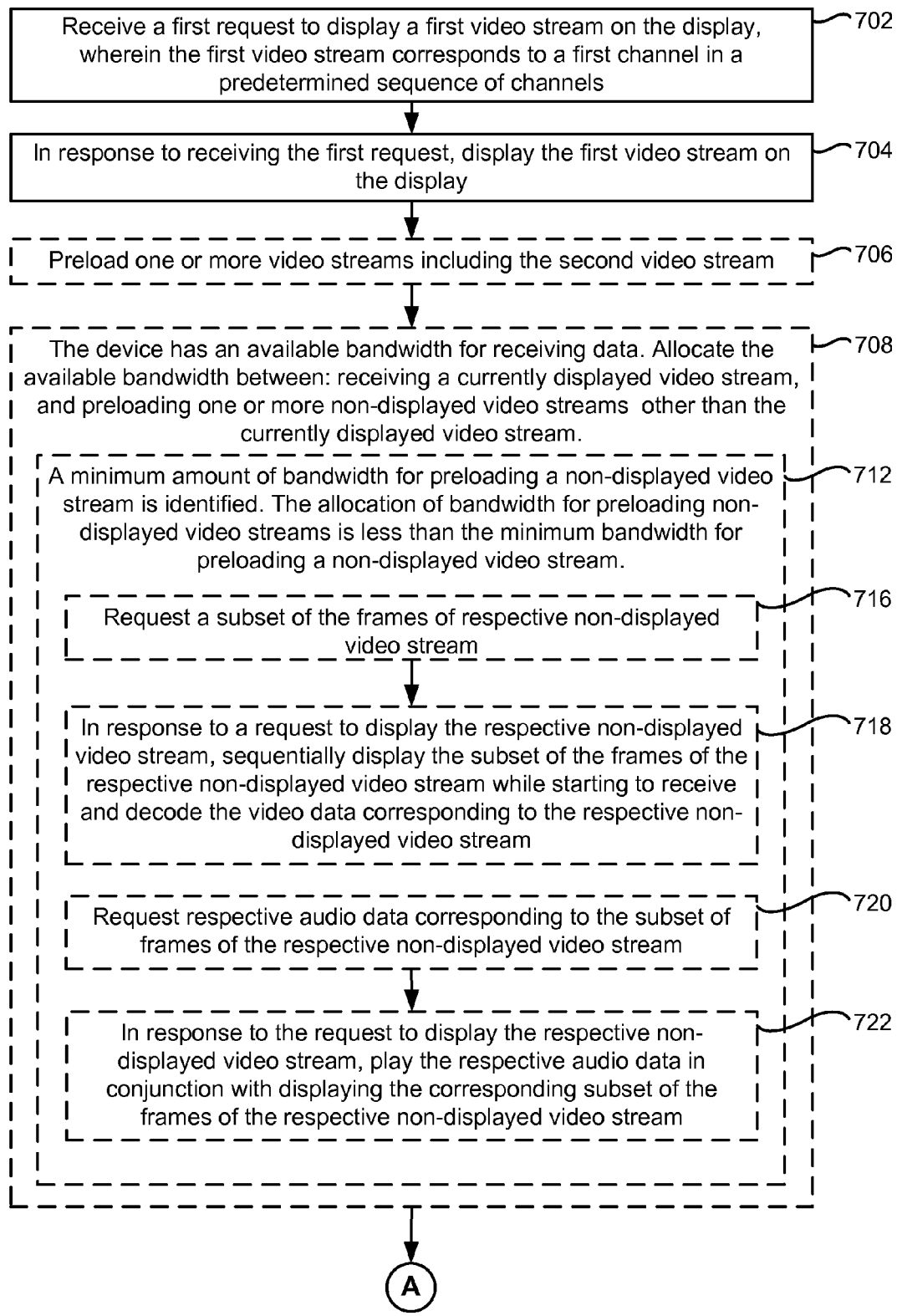
FIGS. 7A-7E are flow diagrams illustrating a method of switching from a first video stream to a non-adjacent second video stream, in accordance with some implementations.
Figure 7B:
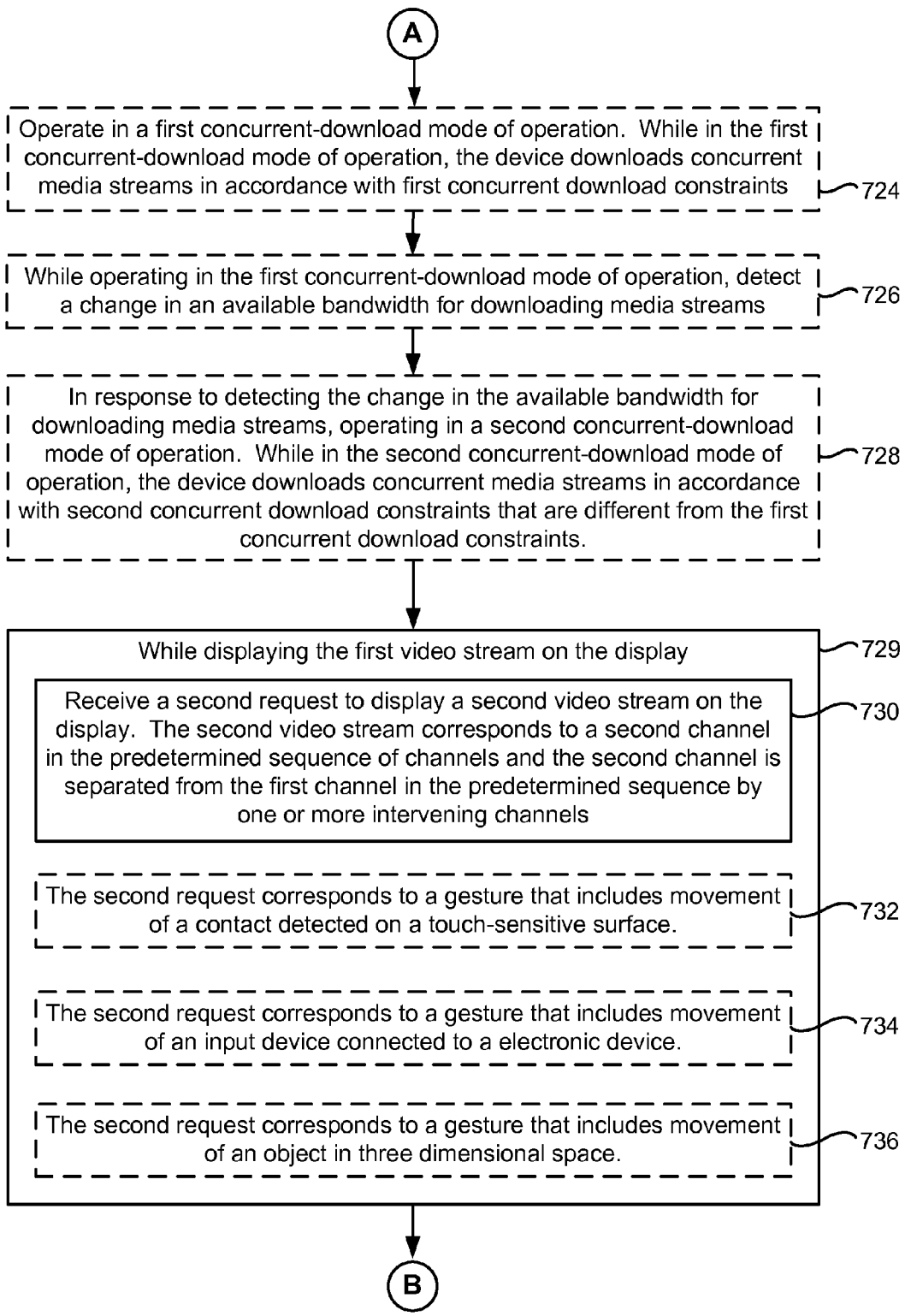
Figure 7C:
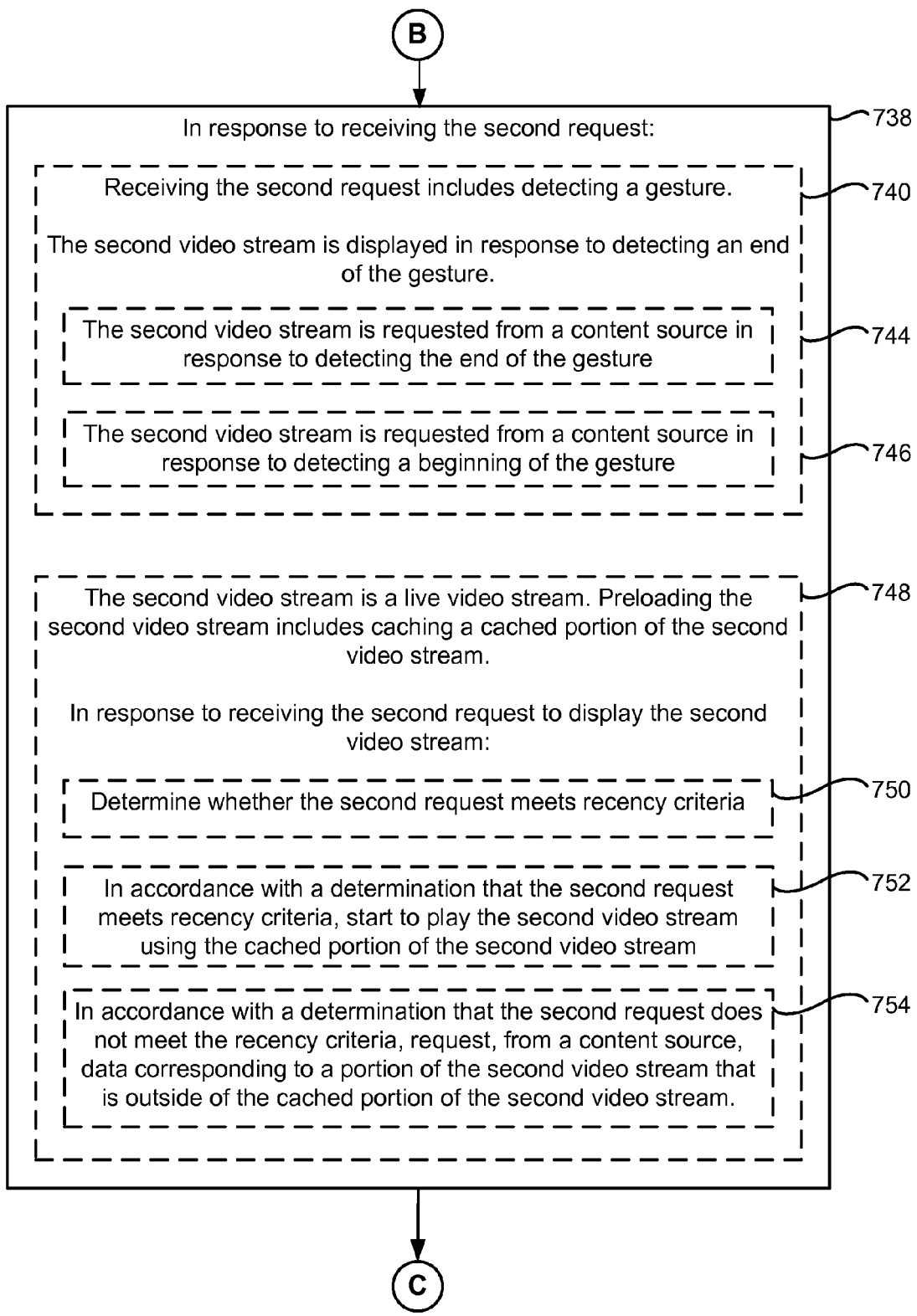
Figure 7D:
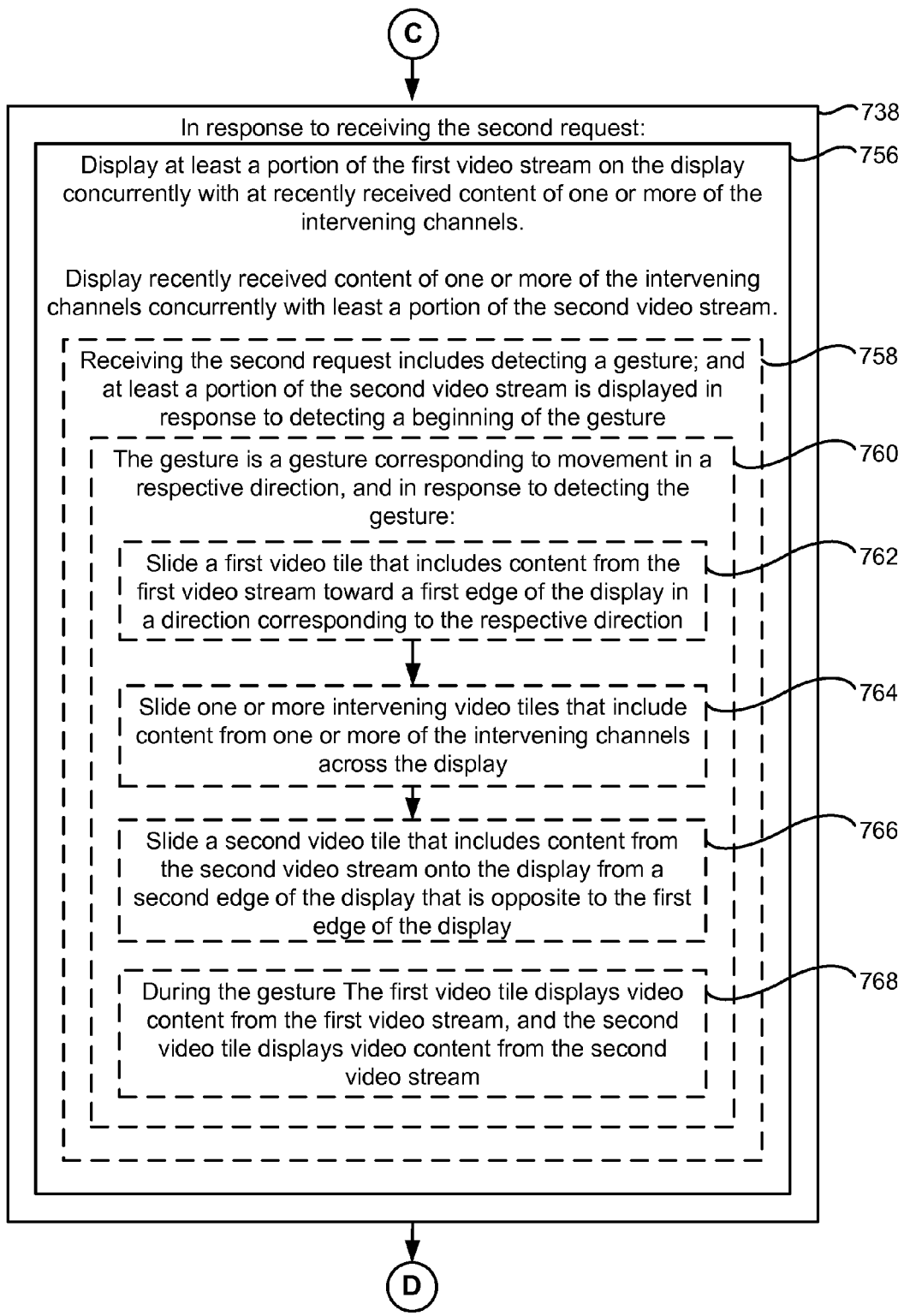
Figure 7E:
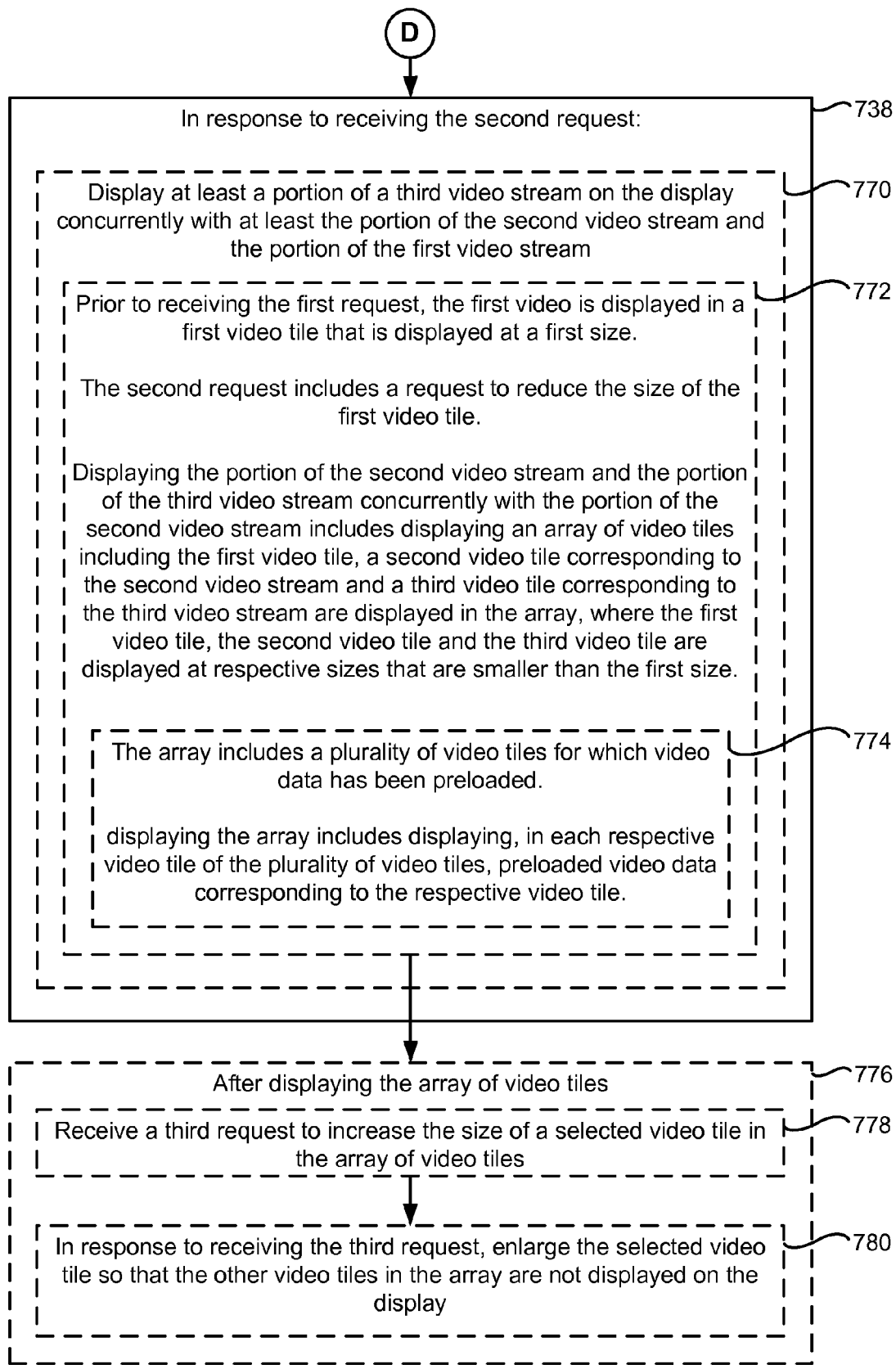

FIG. 5 is a flow diagram illustrating a method of switching video channels, in accordance with some implementations, that conserves network bandwidth and device processing resources while maintaining a user experience of immediate access to a large number of different video streams. In some implementations, an electronic device (e.g., electronic device 102 as shown in FIGS. 1 and 2) receives (502) a request to display a main video stream (e.g., Stream B in FIGS. 4A-4O). For example, the electronic device receives a request from a user to display a particular video stream. In response to receiving the request, the electronic device (e.g., electronic device 102 as shown in FIGS. 1 and 2) requests (504) the main video stream (e.g., Stream B in FIGS. 4A-4O). The requested main video stream (e.g., Stream B in FIGS. 4A-4O) is received from a server system (e.g., server system 120 as shown in FIGS. 1 and 3). The electronic device then displays (506) the main video stream on the display (e.g., an output device 206 as shown in FIG. 2). In some implementations, displaying a video stream on the display includes playing corresponding midin through sneakers or other audio generating devices.

In some implementations, after requesting (504) the main video stream, the electronic device (e.g., electronic device 102 as shown in FIGS. 1 and 2) determines at least a first adjacent video stream and requests (518) the determined first adjacent video stream from a server system (e.g., server system 120 as shown in FIGS. 1 and 3). The electronic device (e.g., electronic device 102 as shown in FIGS. 1 and 2) then downloads/stores/caches (520) at least a portion of the first adjacent video stream. In some implementations, once a predetermined amount of the first adjacent video stream is downloaded/stored/cached, the electronic device (e.g., electronic device 102 as shown in FIGS. 1 and 2) suspends (522) delivery of the first adjacent video stream and ceases to download the first adjacent video stream until further notice. In some implementations, once the portion of the first adjacent video stream has been downloaded/stored/cached, the first adjacent video stream is considered to be "preloaded." In some implementations, the preloading of the first adjacent video stream is periodically refreshed (e.g., the device downloads/stores/caches another 5 seconds of the first adjacent video stream every 1 minute and, optionally discards a previously cached portion of the first adjacent video stream).

In some implementations, the electronic device (e.g., electronic device 102 as shown in FIGS. 1 and 2) requests (524) a second adjacent video stream (e.g., Stream C 404 in FIGS. 4A-4O). The electronic device (e.g., electronic device 102 as shown in FIGS. 1 and 2) then downloads/stores/caches (526) at least a portion of the second adjacent video stream (e.g., Stream C 404 in FIGS. 4A-4O). In some implementations, once a predetermined amount of the second adjacent video stream (e.g., Stream C 404 in FIGS. 4A-4O) is downloaded/stored/cached, the electronic device (e.g., electronic device 102 as shown in FIGS. 1 and 2) suspends (528) delivery of the second adjacent video stream. In some implementations, suspending delivery of the second adjacent video stream includes ceasing to download further video stream data from the server system until further notice from the electronic device (e.g., electronic device 102 as shown in FIGS. 1 and 2). In some implementations, once the portion of the second adjacent video stream has been downloaded/stored/cached, the second adjacent video stream is considered to be "preloaded." In some implementations, the preloading of the second adjacent video stream is periodically refreshed (e.g., the device downloads/stores/caches another 5 seconds of the second adjacent video stream every 1 minute and, optionally discards a previously cached portion of the first adjacent video stream).

In some implementations, the electronic device (e.g., electronic device 102 as shown in FIGS. 1 and 2) preloads a large number of video streams including the first and second adjacent video streams and one or more other non-adjacent video streams. In some implementations, the non-adjacent video streams are preloaded at a lower resolution and/or only still frames (and optionally audio data) are preloaded from the non-adjacent video streams. The number of video streams that are preloaded and the type of preloading that is used for the different video streams optionally varies in accordance with the available network bandwidth, processing capabilities of the electronic device, and other factors, as described below with reference to methods 600 and 700.

In some implementations, while displaying (506) the main video stream, the electronic device (e.g., electronic device 102 as shown in FIGS. 1 and 2) receives (508) a request for a selected adjacent video stream (e.g., Stream C 404 as a shown in FIGS. 4A-4O). The electronic device (e.g., electronic device 102 as shown in FIGS. 1 and 2) determines (510) whether the downloaded/stored/cached portion of the selected adjacent video stream is stale (e.g., determines whether the timestamp range associated with the cached portion of the selected adjacent video stream is outside of a predefined amount of time of a current time and/or does not meet other recency criteria). If the downloaded/stored/cached portion of the selected adjacent video stream is not (511) stale, the electronic device (e.g., electronic device 102 as shown in FIGS. 1 and 2) sets (512) the selected adjacent video stream (e.g., the first or second adjacent video stream) as the main video stream and then requests (504) the main video stream. An advantage of determining whether or not the downloaded/stored/cached portion of the selected adjacent video stream is stale or not is that the device can make use of the downloaded/stored/cached portion of the selected adjacent video stream to reduce the apparent latency of loading the selected adjacent video stream when doing so does not result in stale content being shown to the user; however, when the downloaded/stored/cached portion of the selected adjacent video stream is stale, the device requests the selected adjacent video stream so as to provide the user with current (e.g., non-stale) content corresponding to the selected adjacent video stream.

If the downloaded/stored/cached portion of the selected adjacent video stream is (513) determined not to be stale, the electronic device (e.g., electronic device 102 as shown in FIGS. 1 and 2) seeks (514) to the current time in the selected adjacent video stream (e.g., in the preloaded content corresponding to the selected adjacent video stream). For example, if the user selects Stream C (e.g., by performing a right to left swipe gesture, as shown in FIGS. 4A-4B above), which is adjacent to the main video stream (e.g., Stream B), the electronic device determines whether the downloaded/stored/ cached portion of Stream C includes video data for the current time. In some implementations, the downloaded/stored/ cached media data includes data that identifies the time associated with each frame. In some implementations, once the electronic device (e.g., electronic device 102 as shown in FIGS. 1 and 2) seeks (514) to the current time in the downloaded/stored/cached portion of the selected adjacent video stream, the electronic device (e.g., electronic device 102 as shown in FIGS. 1 and 2) displays (516) the downloaded/ stored/cached portion of the selected adjacent video stream beginning at the current time. The electronic device (e.g., electronic device 102 as shown in FIGS. 1 and 2) then sets (512) the selected adjacent video stream as the main video stream. The electronic device (e.g., electronic device 102 as shown in FIGS. 1 and 2) then requests (504) the main video stream. An advantage of seeking to the current time in the selected adjacent video stream is that the device presents a portion of the selected adjacent video stream to the user that corresponds to a current time while still using the downloaded/stored/cached video data, thereby reducing the apparent latency of loading the selected adjacent video stream without introducing a long delay between broadcast content and corresponding content that is presented to the user. In particular, for live video streams (e.g., sports and/or news), a delay of more than 10 or 15 seconds between the broadcast content and the presented content is likely to degrade the user experience, thus it is advantageous to reduce or eliminate this delay by seeking to the current time when displaying a downloaded/stored/cached portion of a selected adjacent video stream.

FIGS. 6A-6H are flow diagrams illustrating a method 600 of switching between playing video streams in accordance with some implementations. The method 600 is performed at an electronic device (e.g., device 102 or 106 as shown in FIGS. 1 and 2) with a display and a touch-sensitive surface. In some implementations, the display is a touch screen display and the touch-sensitive surface is on the display (e.g., the display and touch sensitive surface shown in FIGS. 4C and 4D). In some implementations, the display is separate from the touch-sensitive surface. Some operations in method 600 are, optionally, combined and/or the order of some operations is, optionally, changed.

As described below, the method 600 provides an intuitive way to switch between playing video streams. The method reduces the cognitive burden on a user when switching between two or more video streams, thereby creating a more efficient human-machine interface. For battery-operated electronic devices, enabling a user to seamlessly switch between video streams with minimal amounts of load time or other disruptions to the viewing experience conserves power and increases the time between battery charges.

In some implementations, an electronic device (e.g., device 102 as shown in FIGS. 1 and 3) with one or more processors, memory, and a display receives (602) a first request to display a first video stream on the display. In response to receiving the first request, the electronic device displays (603) the first video stream on the display (e.g., Stream B as shown in FIG. 4A).

In some implementations, the electronic device, after (e.g., in response to and/or immediately after) receiving the first request to display the first video (e.g., Stream B as shown in FIG. 4A) and prior to receiving a second request to display a second video, the electronic device preloads (605) one or more video streams including the second video stream (e.g., one or more video streams are preloaded before they are requested by the user as further described above with reference to FIG. 5).

In some implementations, the electronic device establishes (607) a connection for receiving the respective video stream from a respective content source (e.g., requesting the respective video stream from a remote source, such as a content delivery server, a peer or a central managed server system or a local source such as a device cache). In some implementations, after establishing the connection for receiving the respective video stream, the device receives (608) at least a portion of content from the respective content source using the connection. In some implementations, while maintaining the connection (e.g., after the connection for receiving the respective video stream has been established), the electronic device stops (609) delivery of the respective video stream to the electronic device from the respective content source. In some implementations, the electronic device downloads/ stores/caches a predefined portion of the respective video stream (e.g., 10, 20, 30, 60 seconds or some other reasonable amount.)

In some implementations, at least a portion of the downloaded/stored/cached portion of the respective video stream is decompressed, decoded and/or otherwise made ready for display. In some situations, once the connection for receiving the respective video stream has been established, a seek to a particular point in the video stream (even a point that has not already been downloaded) is faster than loading the channel from scratch because a connection to the server is already open and the playlist is already parsed. Thus, in some situations preloading channels reduces the perceived load time for a new channel to 0.02 seconds or less. In some situations preloading channels reduces the perceived load time for a new channel from 7 or 8 seconds to 0.5 seconds or less. In some implementations, only channels close to the currently displayed channel are preloaded, while for channels further away from the currently displayed channel, thumbnail images, poster images or static descriptions of content of the channel, low resolution video and/or audio are downloaded for display/presentation if the user switches to the displayed channel before the channel has been preloaded.

In some implementations, the first video stream (e.g., Stream B as shown in FIGS. 4A-4O) corresponds (610) to a first channel in a predetermined sequence of channels. In some implementations, the predetermined sequence of channels is a looping sequence of channels where the initial channel in the sequence is defined as being adjacent to the final channel in the sequence and the second video stream corresponds to a second channel in the predetermined sequence of channels that is adjacent to the first channel. In some implementations, a plurality of channels in the predetermined sequence of channels each have two predetermined adjacent channels and one or more non-adjacent channels (e.g., as shown in television channels). In some implementations, in response to receiving the first request to display the first video stream (e.g., Stream B as shown in FIGS. 4A-4O) on the display, the electronic device starts (612) to download the first video stream from a content source for the first video stream (e.g., a remote source, such as a content delivery server, a peer or a central managed server system or a local source such as a device cache). In some implementations, after starting to download the first video stream, the electronic device starts (613) to preload the second video stream (e.g., Stream C as shown in FIGS. 4A-4O) from the content source for the second video stream. In some implementations, the first video stream (e.g., Stream B as shown in FIGS. 4A-4O) and the second video stream (e.g., Stream C as shown in FIGS. 4A-4O) are downloaded from the same content source. In some implementations, the first video stream (e.g., Stream B as shown in FIGS. 4A-4O) and the second video stream (e.g., Stream C as shown in FIGS. 4A-4O) are downloaded from different content sources.

In some implementations, after starting to download the first video stream, the electronic device starts 620 to preload a third video stream (e.g., Stream D as shown in FIGS. 4I-4O) from a content source for the third video stream (e.g., a remote source, such as a content delivery server, a peer or a central managed server system or a local source such as a device cache), where the third video stream (e.g., Stream A as shown in FIGS. 4I-4O) corresponds to a third channel in the predetermined sequence of channels that is adjacent to the first channel. In some implementations, the first video stream (e.g., Stream B as shown in FIGS. 4A-4O) and the third video stream (e.g., Stream D as shown in FIGS. 4I-4L) are downloaded from the same content source.

In some implementations, the first video stream (e.g., Stream B as shown in FIGS. 4A-4O) and the third video stream (e.g., Stream A as shown in FIGS. 4I-4O) are downloaded from different content sources. In some implementations the second video stream (e.g., Stream C as shown in FIGS. 4A-4O) and the third video stream (e.g., Stream A as shown in FIGS. 4I-4O) are downloaded at the same time. Thus, in some implementations, the peak bandwidth usage includes the amount of bandwidth for downloading the first video stream (e.g., Stream B as shown in FIGS. 4A-4O), the second video stream (e.g., Stream C as shown in FIGS. 4A-4O), and the third video stream (e.g., Stream A as shown in FIGS. 4I-4L) simultaneously. For example, if each video stream has a bandwidth of 1 MB/s, then when the first video stream (e.g., Stream B as shown in FIGS. 4A-4O) is requested, the device starts downloading the first stream (cumulative bandwidth use: 1 MB/s) and after the first stream has started playing starts downloading the second stream (cumulative bandwidth use: 2 MB/s) and the third stream (cumulative bandwidth use: 3 MB/s) and after a predefined amount (e.g., 20 seconds) of the second and third streams have been downloaded, the device continues downloading the first video stream only (cumulative bandwidth use: 1 MB/s). In some implementations, where there is sufficient available bandwidth, a large number of media streams (e.g., 10, 20, 30 or up to 100) are preloaded concurrently. In some implementations, a larger number of media streams are preloaded consecutively and/or concurrently.

In some implementations, after starting to download the first video stream, the electronic device starts (615) to preload a third video stream from a content source, where the third video stream corresponds to a third channel in the predetermined sequence of channels that is adjacent to the first channel. In some implementations, receiving the first request to display the first video stream (e.g., Stream B as shown in FIGS. 4A-4O) includes (616) receiving a channel switching request for switching channels in a detected channel-switching direction in the predetermined sequence of channels (e.g., the device determines that the user is channel surfing by sequentially traversing the predetermined sequence of channels in the channel-switching direction). In some implementations, the electronic device selects an order for preloading the second channel and the third channel in accordance with the detected channel-switching direction. For example, if the second channel (e.g., Stream C) is a next channel in the detected channel-switching direction, then the device preloads the second video stream (e.g., Stream C) before preloading the third video stream (e.g., Stream A); in contrast, if the third channel (e.g., Stream A) is a next channel in the detected channel-switching direction, then the device preloads the third video stream (e.g., Stream A) before preloading the second video stream (e.g., Stream C). As another example, after switching from Stream B to Stream C as shown in FIGS. 4A-4B, the electronic device preloads Stream D before preloading Stream B, because Stream D is in the channel-switching direction.

In some implementations, the electronic device operates (618) in a first concurrent-download mode of operation, wherein while in the first concurrent-download mode of operation, the device downloads concurrent media streams in accordance with first concurrent download constraints (e.g., a maximum number of media streams that can be concurrently downloaded and/or a maximum amount of time that a peak download threshold can be maintained).

In some implementations, while operating in the first concurrent-download mode of operation, the electronic device detects (620) a change in an available bandwidth for downloading media. In some implementations, in response to detecting the change in the available bandwidth for downloading media streams, the electronic device operates (621) in a second concurrent-download mode of operation, where, while in the second concurrent-download mode of operation, the device downloads concurrent media streams in accordance with second concurrent download constraints that are different from the first concurrent download constraints. For example, if the device has a large amount of available bandwidth (e.g., 100 MB/s), the device will operate in a relatively unlimited concurrent-download mode of operation where three or more media streams are allowed to be downloaded simultaneously (e.g., starting to download multiple media streams corresponding to adjacent channels that are adjacent to a currently selected video channel). In contrast, if the device has an intermediate amount of available bandwidth (e.g., 3 MB/s), the device will operate in an intermediate concurrent-download mode of operation where two media streams are allowed to be downloaded simultaneously for as long as necessary (e.g., starting to download a second video stream as soon as a gesture corresponding to switching video streams has started). Additionally, in some implementations, in a situation where the device has a more limited amount of available bandwidth (e.g., 1 MB/s or less), the device will operate in a limited concurrent-download mode of operation where either only one media stream will be downloaded at a time, or the amount of time that two media streams can be downloaded concurrently is restricted (e.g., starting to download a second video stream only after a gesture corresponding to switching video streams has ended).

In some implementations, the electronic device has an available bandwidth for receiving data, and allocates (623)

the available bandwidth (e.g., in accordance with bandwidth-allocation criteria) between receiving a currently displayed video stream, (e.g., the first video stream such as Stream A) and preloading one or more non-displayed video streams (e.g., the second video stream such as Stream B). In some implementations, a minimum amount of bandwidth for preloading a non-displayed video stream is identified (e.g., by the electronic device). In some implementations, the minimum amount of bandwidth is a predetermined limit selected so as to avoid noticeable network congestion for the user, and the minimum amount of bandwidth corresponds to a minimum possible bandwidth over which the data for preloading a non-displayed video stream can be received by the device.

In some implementations, a first number of non-displayed video are to be preloaded (e.g., in accordance with a dynamic determination, default device settings, and/or custom device settings), and allocating the available bandwidth includes (625) determining a respective quality level (e.g., an audio and/or video stream quality level such as bit rate, frame rate, resolution, and/or compression level) at which the currently displayed video stream (e.g., Stream B as shown in FIGS. 4A-4O) can be received and the first number of non-displayed video streams can be preloaded, and allocating the available bandwidth so that each of the video streams is at the respective quality level. In some implementations, the electronic device allocates a first amount of the bandwidth for receiving the currently displayed video stream in accordance with the quality level and allocates a second amount of the bandwidth to each respective non-displayed video stream of a plurality of non-displayed video streams for preloading the non-displayed video streams at the same quality level. In some implementations, the first amount of bandwidth is larger than the second amount of bandwidth, because the first amount of bandwidth enables the device to display a continuous stream of video data while the second amount of bandwidth enables the device to receive occasional updates to the preloaded content of the second video stream. In some implementations, the first amount of bandwidth is the same as the second amount of bandwidth because, at least initially, the displayed video stream and the one or more non-displayed video streams are downloaded concurrently and at comparable quality levels.

In some implementations, the electronic device detects (626) a change in the available bandwidth, and in response (627) to detecting the change in the available bandwidth, the electronic device changes (629) the respective quality level (e.g., if the total bandwidth available decreases, the device lowers the requested video quality level) and allocates (630) the available bandwidth in accordance with the change in the respective quality level. For example, if the available bandwidth decreases, then the quality level decreases and the bandwidth allocated to the currently displayed video stream and the non-displayed video stream is decreased. In some implementations, the downloading of the non-displayed video streams is stopped or slowed if there is not sufficient bandwidth to maintain a given quality/desired level for the displayed video stream (e.g., so as to avoid degrading the quality of the video that is being displayed to the user).

In some implementations, the currently displayed video is associated with a first quality level and the electronic device allocates (632) the available bandwidth includes allocating the available bandwidth in accordance with the first quality level and the second quality level (e.g., the currently viewed channel is received at a relatively higher bitrate, the neighboring channels are received at a relatively lower bitrate.) In some implementations, a plurality of non-displayed video streams are associated with the second quality level. In some implementations, one or more of the non-displayed video streams are associated with a third quality level different from the first quality level and the second quality level. For example, a currently displayed video stream has a relatively higher bitrate, an adjacent video stream that is "next" (e.g., Stream C) in accordance with a last channel-switching direction has an intermediate bitrate and an adjacent video stream that is "previous" (e.g., Stream A) in accordance with a last channel-switching direction has a relatively lower bitrate. For example, when a user swipes from right-to-left on a touchscreen, the device displays a currently displayed video stream in the middle of the display at the higher bitrate, and preloads the "right" non-displayed video stream that will be displayed if another right-to-left swipe is detected at an intermediate bit rate, and preloads the "left" non-displayed video stream that will be displayed if a left-to-right swipe is detected at the lower bit rate.

In some implementations, the available bandwidth is (634) allocated in accordance with an historical pattern of video stream switching of a particular user. In some implementations, a user is explicitly identified by logging in to a service or an account on a device. In some implementations, the user is implicitly identified by their behavior or the device assumes that there is a single user for the device. For example some people just watch one show for an entire hour, other people are "channel surfers" who change channels frequently. The electronic device could watch user behavior to classify a user (e.g., based on a number of different channels viewed by the user, an average time spent watching a channel, or a minimum amount of time spent watching a channel), and then choose bitrates accordingly. For instance, the user who seldom or never surfs could get their main channel in a very high bitrate, and neighboring channels as stills only. A different user who channel surfs constantly could get all three channels in a medium bitrate.

In some implementations, the available bandwidth is (636) allocated in accordance with recent video switching activity. For example, if the user has switched video streams recently (e.g., within the last 1, 2, 5, 15, 30, or 60 seconds), more of the available bandwidth is allocated for preloading the adjacent video streams and the neighboring channels are preloaded at a higher bitrate than a preloading bitrate that is used while the user is not switching video streams. In contrast, if the user has not switched video streams in several minutes, then more of the available bandwidth is allocated for receiving the currently displayed video stream and the currently displayed video stream is received at a higher bitrate than a primary-stream bitrate that is used while the user is switching video streams.

In some implementations, the available bandwidth is (637) allocated in accordance with a current position within the currently displayed video stream. In some implementations, the bandwidth is allocated in accordance with a proximity of the current position to discontinuities in the currently displayed video stream (e.g., an end of a broadcast or television show or a commercial break). For example, a user is likely to change channels after a television show ends and/or at the start of a commercial break. In some implementations, the device identifies when these events are about to occur, and increases the amount of bandwidth allocated to preloading the adjacent video streams so as to anticipate a channel change. In some implementations, in addition to increasing the amount of bandwidth allocated to preloading the adjacent video streams, the device reduces the amount of bandwidth allocated to receiving the currently displayed video stream.

In some implementations, the available bandwidth is (638) allocated in accordance with a data network over which data corresponding to the one or more non-displayed video streams is received. In some implementations, when a cellular data network is being used instead of a wireless network, the device reduces the amount of the bandwidth that is allocated to preloading non-displayed video streams so as to reduce data usage for preloading non-displayed video streams in situations where the user has a data limit or is charged for the amount of data that is used (e.g., when using a cellular data plan to download data).

In some implementations, the allocation of bandwidth for preloading non-displayed video streams is (640) less than the minimum bandwidth for preloading a non-displayed video stream (e.g., the electronic device does not have sufficient bandwidth to download the displayed video stream at a desired quality level and also download one or more non-displayed video stream). The electronic device requests (642) a subset of the frames of a respective non-displayed video stream. In some implementations, the electronic device requests a subset of the frames of a respective non-displayed video stream (e.g., requesting keyframes of the second video stream), and, in response to a request to display the respective non-displayed video stream, the electronic device (e.g., device 102 as shown in FIGS. 1 and 2) sequentially displays (643) the subset of the frames of the respective non-displayed video stream while starting to receive and preparing to display the video data (e.g., decompressing and decoding the video data) corresponding to the respective non-displayed video stream (e.g., in response to a request to display the second video stream the electronic device displays a slideshow of the keyframes of the second video stream while retrieving the full video stream). In some implementations, the device delays the start of preloading of non-displayed video streams until a sufficient buffer (e.g., 5, 10, 15, 20 or 30 seconds) of the displayed video stream has been downloaded to the electronic device.

In some implementations, the electronic device requests (645) respective audio data corresponding to the subset of frames of the respective non-displayed video stream (e.g., audio data corresponding to the second video stream is downloaded along with keyframes for the second video stream). In response to the request to display the respective non-displayed video stream, the electronic device plays (646) the respective audio data in conjunction with displaying the corresponding subset of the frames of the respective non-displayed video stream (e.g., in response to a request to display the second video stream displaying a slideshow of the keyframes of the second video stream and playing audio of the second video stream while retrieving the video stream).

In some implementations, while (648) displaying the first video stream on the display, the electronic device receives (650) a second request to display a second video stream (e.g., Stream C as shown in FIGS. 4A-4O) on the display. In some implementations, the second request corresponds (652) to a gesture that includes movement of a contact detected on a touch-sensitive surface (e.g., the second request corresponds to a tap or swipe gesture on a touch-sensitive surface such as a track pad or touchscreen 426 as shown in FIGS. 4C and 4D or a touchscreen as shown in FIGS. 4A and 4B). In some implementations, the second request corresponds (653) to a gesture that includes movement of an input device connected to an electronic device (e.g., the second request corresponds to movement of a mouse or joystick 448 corresponding to movement of a cursor on the display as shown in FIGS. 4E and 4F). In some implementations, the second request corresponds (654) to a gesture that includes movement of an object in three dimensional space (e.g., the second request corresponds to movement of a remote control detected via an infrared light bar or movement of a user's arm/hand detected via motion tracking cameras as shown in FIGS. 4G and 4H).

In some implementations, the electronic device performs one or more operations in response (656) to receiving the second request. In some implementations, the second video stream is (658) a live video stream, (e.g., a video stream that is not "on demand" but corresponds to a broadcast such as a live performance, sporting event or newscast) and preloading the second video stream includes downloading/storing/caching a portion (sometimes referred to as a "cached portion") of the second video stream. In some implementations, in response to receiving the second request to display the second video stream, the electronic device determines (660) whether the second request meets recency criteria. In some implementations, the second request meets the recency criteria when a current "live stream time" of the second video stream is sufficiently close to (e.g., within a predefined time threshold such as 10, 20, 30, 60 seconds or some other reasonable time threshold of) a video stream timestamp or range of timestamps corresponding to the cached portion of the second video stream.

In some implementations, in accordance with a determination that the second request meets recency criteria, the electronic device starts (661) to play the second video stream using the cached portion of the second video stream. In some implementations, the electronic device requests, from a content source, data corresponding to a portion of the second video stream starting at the end of the cached portion of the second video stream. Thus, in some implementations (e.g., where the second video stream can start to play immediately from the cache with minimal delay), the electronic device does not seek to return to live programming (e.g., programming with a minimal broadcast delay), even if the second stream is live video and exchanges a slight lag behind the "live stream time" for a reduced latency in starting to play the second video stream on the device. In some implementations, in accordance with a determination that the second request does not meet the recency criteria, the electronic device requests (662), from the content source for the second video stream, data corresponding to a portion of the second video stream that is outside of the cached portion of the second video stream. In some situations, the seek at this point is faster than downloading the channel from scratch because a connection to the server is already open and the playlist has already been examined and the information from the playlist has been extracted so that different content referenced by the playlist can be readily accessed.

In some implementations, in response (656) to receiving the second request the electronic device displays (664) at least a portion of the first video stream (e.g., Stream B as shown in FIGS. 4A-4O) on the display concurrently with at least a portion of the second video stream (e.g. as shown in FIGS. 4C-4H). In some implementations, the second video stream was received, at least in part, from a content source for the second video stream in response to a request, from the electronic device to the content source for the second video stream, for delivery of the second video stream from the content source for the second video stream to the electronic device. In some implementations the first and second video streams are live video streams. In some implementations, the first and second video streams are on-demand video streams. In some implementations, live video is displayed with on-screen EPG (electronic program guide) metadata and on-demand video is displayed with on-screen TV show or film metadata from a content provider or third party content database. In some implementations, data corresponding to the video streams is received from a local content source such as a Local Cache (e.g., Media Content Database 245 in FIG. 2). In some implementations, data corresponding to the video stream is received from a remote content source such as a Network Cache (e.g., a local network cache providing data to an output device such as a network attached storage device providing content to a portable electronic device such as a smart phone or tablet); Peers in a peer-to-peer network; a Content Delivery Server in a content delivery network (e.g., a distributed set of content delivery servers dedicated to providing content to clients); and/or a Central Managed Server such as a backend server of a video application playing the video. In some implementations, streams are optionally encrypted with an encryption key once per segment, per bit rate, or per video file. In some implementations, the second video stream is received from the content source before being requested by the electronic device (e.g., data corresponding to the second video stream is prefetched) in response to a recommendation from another user or a prediction that the user is likely to play the second video stream in the future.

In some circumstances, a content source (e.g., the content source for the second video stream) is a content storage source that stores content for retrieval by one or more electronic devices. For example, in some implementations, the content source is a long-term content storage source that stores the content for more than a predetermined amount of time (e.g., 30 minutes, an hour, a day or some other predetermined amount of time) so that the content is available for on-demand delivery to the electronic device (e.g., rather than just temporarily buffering a small amount of content while the content is being decompressed or decoded). In some circumstances, a content source (e.g., the content source for the second video stream) is a content generation source that generates compressed and/or encoded chunks of content from a stream of live content (e.g., a live broadcast of a sporting event or newscast) that can be decompressed and/or decoded at the electronic device. For example, in some implementations, the content source is a computer system that stores content for on-demand viewing and/or generates content (e.g., by encoding and/or compressing source media such as video of a live event) for delivery to one or more different electronic devices over a public, general-purpose, network (e.g., a packet-switched network such as the Internet). Thus, in some implementations a cable box or other device that simply decodes, descrambles and/or decompresses content received from a remote content source (e.g., a media provider such as a cable TV provider or a satellite TV provider) is not a content source, because it does not store content for on-demand viewing or generate content for delivery to an electronic device over a public, general-purpose network such as the Internet.

In some implementations, receiving the second request includes detecting (665) a gesture (e.g., a swipe gesture detected on a touch-sensitive surface as shown in FIGS. 4A-4B), and the second video stream is displayed in response to detecting an end of the gesture.

In some implementations, the second video stream (e.g., Stream C as shown in FIGS. 4A-4O) is (667) requested from the content source for the second video stream in response to detecting the end of the gesture (e.g., the device downloads the second video stream in response to detecting the end of the gesture and plays the second video stream when it becomes available). In some implementations, while waiting for the second video stream to be received, decompressed, and/or decoded, the device displays a last available frame from the channel. Thus, in some implementations, the peak bandwidth usage includes an amount of bandwidth for downloading the first video stream and the second video stream concurrently, which occurs in response to detecting the end of the gesture.

In some implementations, in the absence of a last available frame for a respective video stream, the device displays a placeholder image (e.g., a black box or loading icon) displays information about the respective video stream, and/or requests a frame for the respective video stream.

In some implementations, the second video stream (e.g., Stream C as shown in FIGS. 4A-4O) is (668) requested from the content source for the second video stream in response to detecting a beginning of the gesture (e.g., the device downloads the second video stream in response to detecting the beginning of the gesture, such as a touch down event on a touch-sensitive surface or a mouse hover event, so as to reduce the apparent lag time in downloading the second video stream). In some implementations, while waiting for the second video stream to be received, decompressed, and/or decoded, the device displays a last available frame from the channel of the second video stream. Thus, in some implementations, the peak bandwidth usage includes an amount of bandwidth for downloading the first video stream and the second video stream concurrently, which occurs in response to detecting the beginning of the gesture.

In some implementations, receiving the second request includes (670) detecting a gesture (e.g., a swipe gesture detected on a touch-sensitive surface), and at least a portion of the second video stream (e.g., Stream C as shown in FIGS. 4A-4O) is displayed in response to detecting a beginning of the gesture. In some implementations, the gesture is (672) a gesture corresponding to movement in a respective direction (e.g., substantially upward, downward, left-to-right, or right-to-left movement of a contact on a touchscreen or touch-sensitive surface, a remote control device or user body part in front of a motion detector, and/or movement of a cursor corresponding to movement of a mouse or other pointing device), and in response to detecting the gesture, the electronic device slides a first video tile that includes displayed content from the first video stream toward a first edge of the display in a direction corresponding to the respective direction and, optionally, slides a second video tile that includes displayed content from the second video stream onto the display from a second edge of the display that is opposite to the first edge of the display (e.g., as shown in FIGS. 4A-4B, 4C-4D, 4E-4F, and 4G-4H). In some implementations, the first video tile and/or the second video tile move in accordance with the movement in the respective direction, so that for a respective amount of movement in the respective direction, the first video tile and/or the second video tile move by a proportional amount in the respective direction. In some implementations, during the gesture, the first video tile (e.g., a video tile corresponding to Stream B as shown in FIGS. 4A-4O) displays (674) video content from the first video stream; and the second video tile (e.g., a video tile corresponding to Stream C as shown in FIGS. 4A-4O) displays video content from the second video stream. In some implementations, after detecting an end of the input (e.g., a liftoff of a contact that performed the gesture or an up-click of a mouse button), the device moves the first video tile and/or the second video tile so as to align the first video tile and/or the second video tile with a predefined grid and/or snap the first video tile and/or the second video tile to a predefined arrangement (e.g., with a main video tile displayed in approximately a center of an application window or display).

In some implementations, while displaying (676) the portion of the first video stream on the display concurrently with displaying the portion of the second video stream, the electronic device plays (678) first audio content associated with the first video stream. The electronic device determines (680) that audio-switching criteria have been met. In some implementations, the audio-switching criteria are met when more than a predetermined amount of the second video stream is displayed on the display. For example, the audio-switching criteria are met when at least a predefined percentage (e.g., 10%, 20%, 30%, 40%, 50%, 60% or some other reasonable percentage) of a video tile including the second video stream (e.g., Stream C) is displayed on the display. In some implementations, the audio-switching criteria are met when less than a predetermined amount of the first video stream is displayed on the display. For example, the audio-switching criteria are met when less than a predefined percentage (e.g., 10%, 20%, 30%, 40%, 50%, 60% or some other reasonable percentage) of a video tile including the first video stream is displayed on the display.

In some implementations, the electronic device, in response to determining that the audio-switching criteria have been met, plays (683) second audio content associated with the second video. In some implementations, prior to playing the second audio content, the electronic device ceases (682) to play the first audio content (e.g., playing the second audio content instead of the first audio content). In some implementations, the starting to play the second audio content instead of the first audio content includes stopping play of the first audio content and starting play of the second audio content (e.g., an abrupt cut between the first audio content and the second audio content). In some implementations, starting to play the second audio content instead of the first audio content includes fading the first audio content out to silence and fading the second audio content in from the silence (e.g., cross fading with silence).

In some implementations, while playing the second audio content, the electronic device continues (685) to play the first audio content (e.g., the device produces audio corresponding to an overlapping cross fade between the first audio content and the second audio content). In some implementations, in response to receiving the second request, (e.g., a request including a swipe gesture in a respective direction) the electronic device slides (687) a video tile that includes content from the second video onto the display, and the electronic device optionally, slides a video tile that includes content from the first video stream off of the display. In some implementations, video tiles move in accordance with the movement in the respective direction, so that for a respective amount of movement in the respective direction, the first video tile and/or the second video tile move by a proportional amount in the respective direction. In some implementations, after detecting an end of the input (e.g., a liftoff of a contact that performed the gesture or an up-click of a mouse button), the device moves the first video tile and/or the second video tile so as to align the first video tile and/or the second video tile with a predefined grid and/or snap the first video tile and/or the second video tile to a predefined arrangement (e.g., with a main video tile displayed in approximately a center of an application window or display). In some implementations, while playing the first audio content and the second audio content, the electronic device reduces (688) an amplitude of the first audio content relative to an amplitude of the second audio content in accordance with an amount of the video tile that is displayed on the display (e.g., the device produces audio corresponding to a cross fade between the first audio content and the second audio content that is weighted based on proportion of the second video stream that is displayed on display). In some implementations, the amplitude of the first audio content is decreased and the amplitude of the second audio content is increased as the video tile slides further onto the display. For example, in FIG. 4B, approximately 70% of the video tile corresponding to Stream B is displayed simultaneously with approximately 30% of the video tile corresponding to Stream C and thus the audio for Stream B and Stream C are, optionally, blended so that the audio of Stream C accounts for about 70% of the audio output of the electronic device and the audio of stream B accounts for about 30% of the audio output of the electronic device.

While the implementations described herein have use the example of sliding video tiles across the display, in some implementations one or more other visual effects are used instead of or in addition to sliding video tiles when switching between displaying a first video stream and displaying a second video stream. For example, one such visual effect is a transition where the first video stream dissolves to reveal the second video stream "underneath" the first video stream. As another example, one such visual effect is a transition where a "wipe" effect transitions where the first video stream is wiped away to reveal the second video stream (e.g., so that during a right-to-left swipe gesture, a first portion of the display that is to the left of the user's hand displays the first video stream while a second portion of the display that is to the right of the user's hand displays the second video stream, where the first portion decreases in size and the second portion increases in size as the user's hand moves further from right-to-left, or vice versa for a left-to-right swipe gesture). As another example, one such visual effect is a transition where the first video stream fades to black (or another solid color) and the second video stream fades in from the black (or other solid color). One or more of these visual effects are optionally combined with one or more audio effects (e.g., cross fading the audio in accordance with a progress of a visual transition between a first video stream and a second video stream, as described in greater detail above).

In some implementations, in response to the second request, the electronic device displays at least a portion of a third video stream on the display concurrently with at the portion of the second video stream and the portion of the first video stream. Thus, in some implementations, the device displays portions of three or more video streams simultaneously by decreasing a size of the video tiles so as to show multiple video tiles (or portions of multiple video tiles) on the display (e.g., as shown in FIG. 4J where portions of Stream A, Stream B, Stream C, Stream D, and Stream E are displayed simultaneously). For example, the device detects a pinch gesture (e.g., movement of contacts 464 and 466 toward each other as shown in FIGS. 4I-4J) and reduces a size of a video tile and displays portions of adjacent video tiles that correspond to adjacent channels in the sequence of channels (e.g., so that the set of adjacent video tiles looks like a filmstrip). In some implementations, after displaying the portion of the third video stream, the device detects a depinch gesture (e.g., movement of contacts 472 and 474 away from each other as shown in FIGS. 4K-4L) and resumes displaying a single video tile at the standard size. In some implementations, three or more of the video tiles include concurrently playing video streams, so that the user can view video of three or more channels at the same time (e.g., Stream B, Stream C and Stream D are playing simultaneously in FIGS. 4J-4K).

In some implementations, the electronic device displays (690) at least a portion of a third video stream on the display concurrently with at least the portion of the second video stream and the portion of the first video stream. In some implementations, prior to receiving the first request, the first video stream is displayed in a first video tile that is displayed at a first size and the second request includes a request to reduce the size of the first video tile. In some implementations (e.g., where the second request includes a request to reduce the size of the first video tile), displaying the portion of the third video stream concurrently with the portion of the second video stream and the portion of the first video stream includes (691) displaying an array of video tiles including the first video tile, a second video tile corresponding to the second video stream and a third video tile corresponding to the third video stream, where the first video tile, the second video tile and the third video tile are displayed at respective sizes that are smaller than the first size. For example, in FIGS. 4I-4J, the device detects a pinch gesture including movement of contacts 464 and 466 toward each other while a video tile for Stream C is displayed, and, in response to the pinch gesture, the device reduces a size of the video tile for Stream C to a reduced size and displays video tiles for adjacent Stream B and adjacent Stream D at the reduced size. It should be understood that similar animations would, optionally, be displayed in response to detecting a pinch gesture while displaying a video tile corresponding to Stream B, with video tiles corresponding to Stream A and Stream C as the adjacent video tiles.

In some implementations, the array of video tiles is a multi column, multi-row array. In some implementations, the array of video tiles is a single column or single row array of video tiles. In some implementations, the array includes (692) a plurality of video tiles for which video data has been pre-loaded. In some implementations, displaying the array includes displaying, in each respective video tile of the plurality of video tiles, preloaded video data corresponding to the respective video tile (e.g., displaying recent cached video or stills from the video streams corresponding to the video tiles).

In some implementations, after (694) displaying the array of video tiles: the electronic device receives (696) a third request to increase the size of a selected video tile in the array of video tiles (e.g., a depinch gesture such as the movement of contacts 472 and 474 away from each other as shown in FIGS. 4K-4L). In some implementations, in response to receiving the third request, the electronic device enlarges (698) the selected video tile so that the other video tiles in the array are not displayed on the display. For example, in FIGS. 4K-4L, the device detects a depinch gesture including movement of contacts 472 and 474 away from each other over a video tile for Stream D, and, in response, the device increases a size of the video tile for Stream D and ceases to display video tiles for other video streams. In some implementations, analogous operations would be performed if the depinch gesture were to be detected over other video tiles.

It should be understood that the particular order in which the operations in FIGS. 6A-6H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6H. For example, the contacts, gestures, video tiles, video streams, requests, displays, connection, channels, and user interface objects described above with reference to method 600 optionally have one or more of the characteristics of the contacts, gestures, video tiles, video streams, requests, displays, connection, channels, and user interface objects described herein with reference to other methods described herein (e.g., method 700). For brevity, these details are not repeated here.

FIGS. 7A-7E are flow diagrams illustrating a method 700 of transitioning between media channels in accordance with some implementations. The method 700 is performed at an electronic device (e.g., device 102 or 106 as shown in FIGS. 1 and 3) with a display and a touch-sensitive surface. In some implementations, the display is a touch screen display and the touch-sensitive surface is on the display. In some implementations, the display is separate from the touch-sensitive surface. Some operations in method 700 are, optionally, combined and/or the order of some operations is, optionally, changed.

As described below, the method 700 provides an intuitive way to transition between media channels. The method reduces the cognitive burden on a user when switching between media channels, thereby creating a more efficient human-machine interface. For battery-operated electronic devices, enabling a user to switch between media channels faster and more efficiently conserves power and increases the time between battery charges.

In some implementations, the electronic device (e.g., device 102 as shown in FIGS. 1 and 3) receives (702) a first request to display a first video stream on the display, where the first video stream corresponds to a first channel in a predetermined sequence of channels. In some implementations, in response to the first request, the electronic device displays (704) the first video stream (e.g., Stream B as shown in FIGS. 4A-4O) on the display.

In some implementations, after receiving the first request to display the first video and prior to receiving the second request to display the second video, the electronic device preloads (706) one or more video streams including the second video stream. In some implementations, the second video stream is preloaded in addition to preloading one or more adjacent video streams, as described in above with reference to method 600. For example, a non-adjacent video stream such as Stream D in FIGS. 4A-4O and one or more adjacent video streams such as Stream A or Stream C in FIGS. 4A-4O are preloaded before they are requested by the user.

In some implementations, the electronic device has (708) available bandwidth for receiving data (e.g., an available bandwidth for receiving data corresponding to video streams), and the electronic device allocates the available bandwidth (e.g., in accordance with bandwidth-allocation criteria) between: receiving a currently displayed video stream (e.g., the first video stream such as Stream B in FIG. 4A) and preloading one or more non-displayed video streams (e.g., the second video stream such as Stream A, Stream C, and/or Stream D) other than the currently displayed video stream (e.g., as described in above with reference to method 600).

In some implementations, a minimum amount of bandwidth for preloading a non-displayed video stream is (712) identified (e.g., by the electronic device). In some implementations, the minimum amount of bandwidth is a predetermined limit selected so as to avoid noticeable network congestion for the user. In some implementations, the minimum amount of bandwidth corresponds to a minimum possible bandwidth over which the data for preloading a non-displayed video stream can be received by the device. In some implementations, the allocation of bandwidth for preloading non-displayed video streams is less than the minimum bandwidth for preloading a non-displayed video stream. In some implementations, the electronic device requests (716) a subset of the frames of a respective non-displayed video stream (e.g., requesting keyframes of the second video stream). In some implementations, in response to a request to display the respective non-displayed video stream, the electronic device sequentially displays (718) the subset of the frames of the respective non-displayed video stream while starting to receive and decode the video data corresponding to the respective non-displayed video stream (e.g., Stream D). For example, in response to a request to display the second video stream, the electronic device displays a slideshow of the keyframes of the second video stream while retrieving the full video stream as shown in FIGS. 4J and 4K.

In some implementations, the electronic device requests (720) respective audio data corresponding to the subset of frames of the respective non-displayed video stream (e.g., requesting keyframes of the second video stream). In some implementations, in response to the request to display the respective non-displayed video stream, the electronic device plays (722) the respective audio data in conjunction with displaying the corresponding subset of the frames of the respective non-displayed video stream (e.g., in response to a request to display the second video stream the electronic device displays a slideshow of the keyframes of the second video stream and plays audio of the second video stream while retrieving the full video stream).

In some implementations, the electronic device operates (724) in a first concurrent-download mode of operation, where while in the first concurrent-download mode of operation, the device downloads concurrent media streams in accordance with first concurrent download constraints (e.g., a maximum number of media streams that can be concurrently downloaded and/or a maximum amount of time that a peak download threshold can be maintained). In some implementations, while operating in the first concurrent-download mode of operation, the electronic device detects (726) a change in an available bandwidth for downloading media streams. In some implementations, in response to detecting the change in the available bandwidth for downloading media streams, the electronic device operates (728) in a second concurrent-download mode of operation. In some implementations, while in the second concurrent-download mode of operation, the device downloads concurrent media streams in accordance with second concurrent download constraints that are different from the first concurrent download constraints. For example, if the device has a lot of available bandwidth (e.g., 100 MB/s), the device will operate in a relatively unlimited concurrent-download mode of operation where three or more media streams are allowed to be downloaded simultaneously (e.g., the device starts to download multiple media streams corresponding to adjacent channels that are adjacent to a currently selected video channel and, optionally, media streams corresponding to one or more non-adjacent channels such as the second channel). In contrast, if the device has an intermediate amount of available bandwidth (e.g., 3 MB/s), the device will operate in an intermediate concurrent-download mode of operation where two media streams are allowed to be downloaded simultaneously for as long as necessary (e.g., starting to download a second video stream as soon as a gesture corresponding to switching video streams has started). Additionally, in a situation where the device has more limited available bandwidth (e.g., 1 MB/s or less), the device will operate in a limited concurrent-download mode of operation where either: only one media stream can be downloaded at a time or the amount of time that two media streams can be downloaded concurrently is restricted (e.g., starting to download a second video stream only after a gesture corresponding to switching video streams has ended).

In some implementations, while displaying (729) the first video stream (e.g., Stream B) on the display, the electronic device receives (730) a second request to display a second video stream (e.g., Stream D) on the display, where the second video stream corresponds to a second channel in the predetermined sequence of channels and the second channel is separated from the first channel in the predetermined sequence by one or more intervening channels (e.g., the second channel is not adjacent to the currently displayed channel in the predetermined sequence of channels). For example, Stream D is not adjacent to Stream B in FIGS. 4A-4O.

In some implementations, the second request (e.g., the request to display a second video stream) corresponds (732) to a gesture that includes movement of a contact detected on a touch-sensitive surface (e.g., the second request corresponds to a tap or swipe gesture on a touch-sensitive surface such as a track pad or touchscreen 426 as shown in FIGS. 4C and 4D or a touchscreen as shown in FIGS. 4A and 4B). In some implementations, the second request (e.g., the request to display a second video stream) corresponds (734) to a gesture that includes movement of an input device connected to an electronic device (e.g., the second request corresponds to movement of a mouse or joystick 448 corresponding to movement of a cursor on the display as shown in FIGS. 4E and 4F). In some implementations, the second request (e.g., the request to display a second video stream) corresponds (736) to a gesture that includes movement of an object in three dimensional space (e.g., the second request corresponds to movement of a remote control detected via an infrared light bar or movement of a user's arm/hand detected via motion tracking cameras as shown in FIGS. 4G and 4H).

In some implementations, receiving the second request (e.g., the request to display a second video stream) includes (740) detecting a gesture (e.g., a tap gesture detected on a touch-sensitive surface that corresponds to selection of a representation of the second channel such as selection of a representation of a channel from a list or array of representations of channels). In some implementations, the second video stream is (744) displayed in response to detecting the end of the gesture (e.g., the device downloads the second video stream in response to detecting the end of the gesture and plays the second video stream when it becomes available). In some implementations, while waiting for the second video stream to be received, decompressed, and/or decoded, the device displays a last available frame from the channel. Thus, in some implementations, the peak bandwidth usage includes an amount of bandwidth for downloading the first video stream (e.g., Stream B) and the second video stream (e.g., Stream D) concurrently, which occurs in response to detecting the end of the gesture. In some implementations, the second video stream is (746) requested from a content source in response to detecting a beginning of the gesture (e.g., the device downloads the second video stream in response to detecting the beginning of the gesture so as to reduce the apparent lag time in downloading the second video stream). In some implementations, while waiting for the second video stream (e.g., Stream D) to be received, decompressed, and/or decoded, the device displays a last available frame from the channel. Thus, in some implementations, the peak bandwidth usage includes an amount of bandwidth for downloading the first video stream (e.g., Stream B) and the second video stream (e.g., Stream D) concurrently, which occurs in response to detecting the beginning of the gesture.

In some implementations, in response to receiving the second request (e.g., the request to display a second video stream), the electronic device performs one or more operations. In some implementations, (e.g., where the second video stream is preloaded), the second video stream is (748) a live video stream, (e.g., a video stream that is not "on demand" but corresponds to a broadcast such as a live performance, sporting event or newscast) and preloading the second video stream includes downloading/storing/caching a portion (sometimes referred to as a "cached portion") of the second video stream (e.g., Stream D). In response to receiving the second request to display the second video stream (e.g., Stream D), the electronic device determines (764) whether the second request (e.g., the request to display a second video stream) meets recency criteria. In some implementations, the second request (e.g., the request to display a second video stream) meets the recency criteria when a current "live stream time" of the second video stream is sufficiently close to (e.g., within a predefined time threshold such as 10, 20, 30, 60 seconds or some other reasonable time threshold of) a video stream timestamp or range of timestamps corresponding to the cached portion of the second video stream.

In some implementations, in accordance with a determination that the second request (e.g., the request to display a second video stream) meets recency criteria, the electronic device starts (752) to play the second video stream using the downloaded/stored/cached portion of the second video stream (e.g., Stream D). In some implementations, the device requests, from a content source (e.g., a remote source, such as a content delivery server, a peer or a central managed server system or a local source such as a device cache), data corresponding to a portion of the second video stream starting at the end of the downloaded/stored/cached portion of the second video stream. Thus, in some implementations (e.g., where the second video stream can start to play immediately from the cache with minimal delay), the device does not seek to return to live, even if the second stream is live video and exchanges a slight lag behind the "live stream time" for a reduced latency in starting to play the second video stream on the device. In some implementations, in accordance with a determination that the second request (e.g., the request to display a second video stream) does not meet the recency criteria, the electronic device requests (754), from a content source (e.g., a content delivery server, a peer or a central managed server system or a local source such as a device cache), data corresponding to a portion of the second video stream that is outside of the downloaded/stored/cached portion of the second video stream (e.g., Stream D). In some situations, the seek at this point is faster than downloading the channel from scratch because a connection to the server is already open and the playlist has already been examined and the information from the playlist has been extracted so that different content referenced by the playlist can be readily accessed.

In some implementations, in response to receiving the second request (e.g., the request to display a second video stream), the electronic device displays (756) at least a portion of the first video stream on the display concurrently with recently received content of one or more of the intervening channels (e.g., the electronic device displays recently downloaded video stills from intervening channels while switching between non-adjacent channels). In some implementations, the recently received content from one or more of the intervening channels includes video stills from the intervening channels. For example, every so often, perhaps every 10 or 30 seconds, the server takes a video still from each live channel. These still images are delivered to the client. Recently received content from the one or more intervening channels includes content that is representative of content that was recently broadcast "live" on the different channels, and gives the user the ability to preview content that is being broadcast "live" on the different channels. In some situations, the user requests to switch between two channels that are separated from each other by a large number (e.g., more than 5 or more than 10) of intermediate channels and in some embodiments the electronic device animates a jump between a current channel and a newly selected channel. To animate a large jump in channels, while the source and destination channels are both streaming video feeds, the channels in between are recent still images. The animation will happen so quickly (faster as more channels are traversed), it will appear to the user that all of the channels are moving video, not just the source and destination (e.g., this appearance can be produced by switching between the still frames from the channels an effective frame rate of above 24 frames per second where each still frame is displayed for $\frac{1}{24}$ of a second or less or, optionally a higher frame rate such as 48 frames per second). In some implementations, content is preloaded from a plurality of channels. In some implementations the content that is preloaded from the channels includes still images. In some implementations the content that is preloaded from the channels includes audio. In some implementations the content that is preloaded from the channels includes preloaded video. For example, in some situations, the computer system downloads still images and/or audio for all channels and preloads video for a subset of the channels (e.g., every Nth channel, the 10 most frequently watched channels or the 10 most recently watched channels), so as to give the user the impression that a large number of the channels are currently "live" video streams, even if most of the video streams are not currently being downloaded (perhaps to conserve bandwidth).

In some implementations, receiving the second request (e.g., the request to display a second video stream) includes (758) detecting a gesture (e.g., a tap gesture detected on a touch-sensitive surface that corresponds to selection of a representation of the second channel). In some implementations, at least a portion of the second video stream is displayed in response to detecting a beginning of the gesture. In some implementations, the gesture is (760) a gesture corresponding to movement in a respective direction (e.g., substantially upward, downward, left-to-right, or right-to-left movement of a contact on a touchscreen or touch-sensitive surface, a remote control device or user body part in front of a motion detector, and/or movement of a cursor corresponding to movement of a mouse or other pointing device), and in response to detecting the gesture, the electronic device slides (762) a first video tile (e.g., a video tile corresponding to Stream B) that includes content displayed from the first video stream toward a first edge of the display in a direction corresponding to the respective direction. In some implementations, the electronic device slides (764) one or more intervening video tiles (e.g., a video tile corresponding to Stream C) that include content displayed from one or more of the intervening channels across the display. In some implementations, the first video tile slides off the display. In some implementations, the electronic device slides (766) a second video tile (e.g., a video tile corresponding to Stream D) that includes content displayed from the second video stream onto the display from a second edge of the display that is opposite to the first edge of the display. In some implementations, the first video tile and/or the second video tile move in accordance with the movement in the respective direction, so that for a respective amount of movement in the respective direction, the first video tile and/or the second video tile move by a proportional amount in the respective direction (e.g., as shown in FIGS. 4A-4O). In some implementations, during the gesture, the first video tile displays (768) video content from the first video stream. In some implementations, the second video tile displays video content from the second video stream.

In some implementations, in response to the second request (e.g., the request to display a second video stream), the electronic device displays (770) at least a portion of a third video stream on the display concurrently with at least the portion of the second video stream and the portion of the first video stream. Thus, in some implementations, the device displays portions of three or more video streams simultaneously by decreasing a size of the video tiles so as to show multiple video tiles or portions of multiple video tiles on the display (e.g., as shown in FIGS. 4I-4L where portions of tiles corresponding to Stream A, Stream B, Stream C, Stream D, and Stream E are displayed simultaneously). For example, the device detects a pinch gesture and reduces a size of a video tile and displays portions of adjacent video tiles that correspond to adjacent channels in the sequence of channels (e.g., so that the set of adjacent video tiles looks like a filmstrip). In some implementations, after displaying the portion of the third video stream, the device detects a depinch gesture and resumes displaying a single video tile at the standard size (e.g., as shown in FIG. 4L). In some implementations, three or more of the video tiles include concurrently playing video streams, so that the user can view video of three or more channels at the same time.

In some implementations, prior to receiving the second request, the electronic device displays (772) the first video stream in a first video tile that is displayed at a first size, and the second request (e.g., the request to display a second video stream) includes a request to reduce the size of the first video tile (e.g., a pinch gesture including movement of contacts 464 and 466 toward each other as shown in FIGS. 4I-4J.). In some implementations, displaying the portion of the third video stream concurrently with the portion of the second video stream and the portion of the first video stream includes displaying an array of video tiles including the first video tile, a second video tile corresponding to the second video stream and a third video tile corresponding to the third video stream, where the first video tile, the second video tile and the third video tile are displayed at respective sizes that are smaller than the first size. In some implementations, the array of video tiles is a multi-column, multi-row array. In some implementations, the array of video tiles is a single column or single row array of video tiles. In some implementations, the array includes (774) a plurality of video tiles for which video data has been preloaded, and the electronic device displaying the array includes displaying, in each respective video tile of the plurality of video tiles, preloaded video data corresponding to the respective video tile (e.g., displaying recent cached video or stills from the video streams corresponding to the video tiles and, optionally metadata corresponding video streams corresponding to the video tiles). For example, in FIGS. 4I-4J, the device detects a pinch gesture including movement of contacts 464 and 466 toward each other while a video tile for Stream C is displayed, and in response to the pinch gesture, the device reduces a size of the video tile for Stream C to a reduced size and displays video tiles for adjacent Stream B and adjacent Stream D at the same size or some other reduced size. It should be understood that similar animations would, optionally, be displayed in response to detecting a pinch gesture while displaying a video tile corresponding to Stream B, with video tiles corresponding to Stream A and Stream C as the adjacent video tiles and a video tile corresponding to Stream D as a non-adjacent video tile.

In some implementations, after (776) displaying the array of video tiles, the electronic device receives (778) a third request to increase the size of a selected video tile in the array of video tiles. In some implementations, in response to receiving the third request (e.g., the request to increase the size of a selected video tile), the electronic device enlarges (780) the selected video tile so that the other video tiles in the array are not displayed on the display. For example, in FIGS. 4K-4L, the device detects a depinch gesture including movement of contacts 472 and 474 away from each other over a video tile for Stream D, and, in response, the device increases a size of the video tile for Stream D and ceases to display video tiles for other video streams. In some implementations, analogous operations would be performed if the depinch gesture were to be detected over other video tiles.

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7E. For example, the contacts, gestures, video tiles, video streams, requests, displays, connection, channels, and user interface objects described above with reference to method 700 optionally have one or more of the characteristics of the contacts, gestures, video tiles, video streams, requests, displays, connection, channels, and user interface objects described herein with reference to other methods described herein (e.g., method 600). For brevity, these details are not repeated here.

Plural instances are, optionally provided for components, operations, or structures described herein as a single instance. Finally, boundaries between various components, operations, and data stores are somewhat arbitrary, and particular operations are illustrated in the context of specific illustrative configurations. Other allocations of functionality are envisioned and optionally fall within the scope of the implementation(s). In general, structures and functionality presented as separate components in the example configurations are, optionally, implemented as a combined structure or component. Similarly, structures and functionality presented as a single component are, optionally, implemented as separate components. These and other variations, modifications, additions, and improvements fall within the scope of the implementation(s).

It will also be understood that, although the terms "first," "second," are, in some circumstances, used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter is, optionally, practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
   at a client device with one or more processors, memory and a display:
   receiving a first request from a user to display a first video stream on the display, wherein the first video stream corresponds to a first channel in a predetermined sequence of channels;
   in response to the first request, displaying the first video stream on the display; and
   while displaying the first video stream on the display:
   prior to receiving a second request from the user to display a second video stream, wherein the second video stream corresponds to a second channel in the predetermined sequence of channels and the second channel is separated from the first channel in the predetermined sequence by one or more intervening channels along the predetermined sequence, preloading from a remote content source video content of the second video stream and at least one of the one or more intervening channels;
   receiving the second request from the user to display the second video stream on the display; and
   in response to receiving the second request, transitioning to displaying the second video stream by:
   displaying at least a portion of the first video stream on the display concurrently with at least a portion of the preloaded video content of the at least one of the one or more intervening channels; and
   displaying at least a portion of the preloaded video content of the at least one of the one or more intervening channels concurrently with at least a portion of the second video stream.

2. The method of claim 1, wherein:
   receiving the second request includes detecting a gesture; and
   the second video stream is displayed in response to detecting an end of the gesture.

3. The method of claim 2, wherein the second video stream is requested from the remote content source in response to detecting the end of the gesture.

4. The method of claim 2, wherein the second video stream is requested from the remote content source in response to detecting a beginning of the gesture.

5. The method of claim 1, wherein:
   receiving the second request includes detecting a gesture; and
   at least a portion of the second video stream is displayed in response to detecting a beginning of the gesture.

6. The method of claim 5, wherein the gesture is a gesture corresponding to movement in a respective direction;
   the method includes, in response to detecting the gesture:
   sliding a first video tile that includes content from the first video stream toward a first edge of the display in a direction corresponding to the respective direction;
   sliding one or more intervening video tiles that include content from one or more of the intervening channels across the display; and
   sliding a second video tile that includes content from the second video stream onto the display from a second edge of the display that is opposite to the first edge of the display.

7. The method of claim 6, wherein, during the gesture:
   the first video tile displays video content from the first video stream; and
   the second video tile displays video content from the second video stream.

8. The method of claim 1, wherein transitioning to displaying the second video stream includes displaying concurrently at least a portion of the preloaded video content of the at least one of the one or more intervening channels and at least a portion of the preloaded video content of the second video stream.

9. The method of claim 1, wherein:
   the second video stream is a live video stream;
   preloading the second video stream includes caching a cached portion of the second video stream; and
   the method includes, in response to receiving the second request to display the second video stream:
   determining whether the second request meets recency criteria;
   in accordance with a determination that the second request meets recency criteria, starting to play the second video stream using the cached portion of the second video stream; and
   in accordance with a determination that the second request does not meet the recency criteria, requesting, from the remote content source, data corresponding to a portion of the second video stream that is outside of the cached portion of the second video stream.

10. The method of claim 1, wherein
    the client device has an available bandwidth for receiving data; and
    the method includes allocating the available bandwidth between:
    receiving a currently displayed video stream; and
    preloading one or more non-displayed video streams.

11. The method of claim 10, wherein:
    a minimum amount of bandwidth for preloading a non-displayed video stream is identified; and the allocation of bandwidth for preloading non-displayed video streams is less than the minimum bandwidth for preloading a non-displayed video stream; and the method includes:

requesting a subset of frames of a respective non-displayed video stream; and in response to a request to display the respective non-displayed video stream, sequentially displaying the subset of frames of the respective non-displayed video stream while starting to receive and decode video data corresponding to the respective non-displayed video stream.

12. The method of claim 11, further comprising:

requesting respective audio data corresponding to the subset of frames of the respective non-displayed video stream; and in response to the request to display the respective non-displayed video stream, playing the respective audio data in conjunction with displaying the corresponding subset of frames of the respective non-displayed video stream.

13. The method of claim 1, further comprising:

operating in a first concurrent-download mode of operation, wherein while in the first concurrent-download mode of operation, the client device downloads concurrent media streams in accordance with first concurrent download constraints;

while operating in the first concurrent-download mode of operation, detecting a change in an available bandwidth for downloading media streams; and in response to detecting the change in the available bandwidth for downloading media streams, operating in a second concurrent-download mode of operation, wherein, while in the second concurrent-download mode of operation, the client device downloads concurrent media streams in accordance with second concurrent download constraints that are different from the first concurrent download constraints.

14. The method of claim 1, further comprising, in response to the second request, displaying at least a portion of the first video stream on the display concurrently with at least a portion of the preloaded video content of the at least one of the one or more intervening channels and with at least a portion of the second video stream.

15. The method of claim 14, wherein:

prior to receiving the first request, the first video stream is displayed in a first video tile that is displayed at a first size; and the second request includes a request to reduce the size of the first video tile; and the method further comprises displaying at least a portion of a third video stream on the display concurrently with at least the portion of the second video stream and at least the portion of the first video stream, including displaying an array of video tiles including the first video tile, a second video tile corresponding to the second video stream and a third video tile corresponding to the third video stream, where the first video tile, the second video tile and the third video tile are displayed at respective sizes that are smaller than the first size.

16. The method of claim 15, further comprising, after displaying the array of video tiles:

receiving a third request to increase the size of a selected video tile in the array of video tiles; and in response to receiving the third request, enlarging the selected video tile so that the other video tiles in the array are not displayed on the display.

17. The method of claim 15, wherein:

the array includes a plurality of video tiles for which video data has been preloaded; and displaying the array includes displaying, in each respective video tile of the plurality of video tiles, preloaded video data corresponding to the respective video tile.

18. A client device comprising:

a display;

one or more processors; and memory storing one or more programs configured to be executed by the one or more processors, the one or more programs including instructions for:

receiving a first request from a user to display a first video stream on the display, wherein the first video stream corresponds to a first channel in a predetermined sequence of channels;

in response to the first request, displaying the first video stream on the display; and while displaying the first video stream on the display:

prior to receiving a second request from the user to display a second video stream, wherein the second video stream corresponds to a second channel in the predetermined sequence of channels and the second channel is separated from the first channel in the predetermined sequence by one or more intervening channels along the predetermined sequence, preloading from a remote content source video content of the second video stream and at least one of the one or more intervening channels;

receiving the second request from the user to display the second video stream on the display; and in response to receiving the second request, transitioning to displaying the second video stream by:

displaying at least a portion of the first video stream on the display concurrently with at least a portion of the preloaded video content of the at least one of the one or more intervening channels; and displaying at least a portion of the preloaded video content of the at least one of the one or more intervening channels concurrently with at least a portion of the second video stream.

19. A non-transitory computer readable storage medium storing one or more programs, the one or more programs comprising instructions, which when executed by a client device with a display and one or more processors, cause the client device to:

receive a first request from a user to display a first video stream on the display, wherein the first video stream corresponds to a first channel in a predetermined sequence of channels;

in response to the first request, display the first video stream on the display; and while displaying the first video stream on the display:

prior to receiving a second request from the user to display a second video stream, wherein the second video stream corresponds to a second channel in the predetermined sequence of channels and the second channel is separated from the first channel in the predetermined sequence by one or more intervening channels along the predetermined sequence, preload from a remote content source video content of the second video stream and at least one of the one or more intervening channels;

receive the second request from the user to display the second video stream on the display; and in response to receiving the second request, transition to displaying the second video stream by:

displaying at least a portion of the first video stream on the display concurrently with at least a portion of the preloaded video content of the at least one of the one or more intervening channels; and displaying at least a portion of the preloaded video content of the at least one of the one or more intervening channels concurrently with at least a portion of the second video stream.

20. The client device of claim 18, wherein:

the second video stream is a live video stream;

preloading the second video stream includes caching a cached portion of the second video stream; and the one or more programs include instructions for, in response to receiving the second request to display the second video stream:

determining whether the second request meets recency criteria;

in accordance with a determination that the second request meets recency criteria, starting to play the second video stream using the cached portion of the second video stream; and in accordance with a determination that the second request does not meet the recency criteria, requesting, from the remote content source, data corresponding to a portion of the second video stream that is outside of the cached portion of the second video stream.

21. The client device of claim 18, wherein the one or more programs include instructions for:

operating in a first concurrent-download mode of operation, wherein while in the first concurrent-download mode of operation, the client device downloads concurrent media streams in accordance with first concurrent download constraints;

while operating in the first concurrent-download mode of operation, detecting a change in an available bandwidth for downloading media streams; and in response to detecting the change in the available bandwidth for downloading media streams, operating in a second concurrent-download mode of operation, wherein, while in the second concurrent-download mode of operation, the client device downloads concurrent media streams in accordance with second concurrent download constraints that are different from the first concurrent download constraints.

22. The client device of claim 18, wherein the one or more programs include instructions for, in response to the second request, displaying at least a portion of the first video stream on the display concurrently with at least a portion of the preloaded video content of the at least one of the one or more intervening channels and with at least a portion of the second video stream.

23. The client device of claim 18, wherein:

prior to receiving the first request, the first video stream is displayed in a first video tile that is displayed at a first size; and the second request includes a request to reduce the size of the first video tile; and the method further comprises displaying at least a portion of a third video stream on the display concurrently with at least the portion of the second video stream and at least the portion of the first video stream, including displaying an array of video tiles including the first video tile, a second video tile corresponding to the second video stream and a third video tile corresponding to the third video stream, where the first video tile, the second video tile and the third video tile are displayed at respective sizes that are smaller than the first size.

24. The client device of claim 23, wherein:

the array includes a plurality of video tiles for which video data has been preloaded; and displaying the array includes displaying, in each respective video tile of the plurality of video tiles, preloaded video data corresponding to the respective video tile.

* * * * *